United States Patent [19]

Honma

[11] Patent Number: 5,566,380
[45] Date of Patent: Oct. 15, 1996

[54] AUTOMATIC FOCUSING SYSTEM WITH RESPONSE CONTROL USING FUZZY INTERFERENCE

[75] Inventor: Hideo Honma, Tokyo, Japan

[73] Assignee: Canon Kabushiki Kaisha, Tokyo, Japan

[21] Appl. No.: 427,498

[22] Filed: Apr. 24, 1995

Related U.S. Application Data

[63] Continuation of Ser. No. 199,980, Feb. 22, 1994, abandoned, which is a continuation of Ser. No. 49,623, Apr. 19, 1993, abandoned, which is a continuation of Ser. No. 905,156, Jun. 24, 1992, abandoned, which is a continuation of Ser. No. 578,024, Sep. 5, 1990, abandoned.

[30] Foreign Application Priority Data

Sep. 10, 1989 [JP] Japan ................................ 1-233836
Sep. 10, 1989 [JP] Japan ................................ 1-233836

[51] Int. Cl.$^6$ .................................................. G03B 13/36
[52] U.S. Cl. ................................ 396/49; 396/125
[58] Field of Search .................................. 354/400, 402, 354/409; 348/349–356; 250/201.2, 201.7

[56] References Cited

U.S. PATENT DOCUMENTS

| | | | |
|---|---|---|---|
| 4,695,893 | 9/1987 | Makino et al. | 358/227 |
| 4,762,986 | 8/1988 | Suda et al. | 250/201.2 |
| 4,833,541 | 5/1989 | Takuma et al. | 358/227 |
| 4,841,370 | 6/1989 | Murashima et al. | 358/227 |
| 4,871,906 | 10/1989 | Ueda et al. | 250/201.2 |
| 4,922,346 | 5/1990 | Hidaka et al. | 358/227 |
| 4,950,054 | 8/1990 | Wada et al. | 358/227 X |
| 4,967,287 | 10/1990 | Takuma et al. | 358/227 |
| 5,025,499 | 6/1991 | Inoue et al. | 364/165 |
| 5,057,859 | 10/1991 | Ishimaru | 354/400 |
| 5,083,150 | 1/1992 | Nakasaki et al. | 354/402 |
| 5,121,151 | 6/1992 | Kawabata et al. | 354/402 |

*Primary Examiner*—W. B. Perkey
*Attorney, Agent, or Firm*—Robin, Blecker, Daley, & Driscoll

[57] ABSTRACT

An automatic focusing system is arranged to use as a parameter a signal component which is extracted from an image signal and varies with the state of focus, to compute an evaluation value on the basis of a degree to which the signal component satisfies preset conditions or rules, and to adjust focus on the basis of the result of the computing operation.

51 Claims, 21 Drawing Sheets

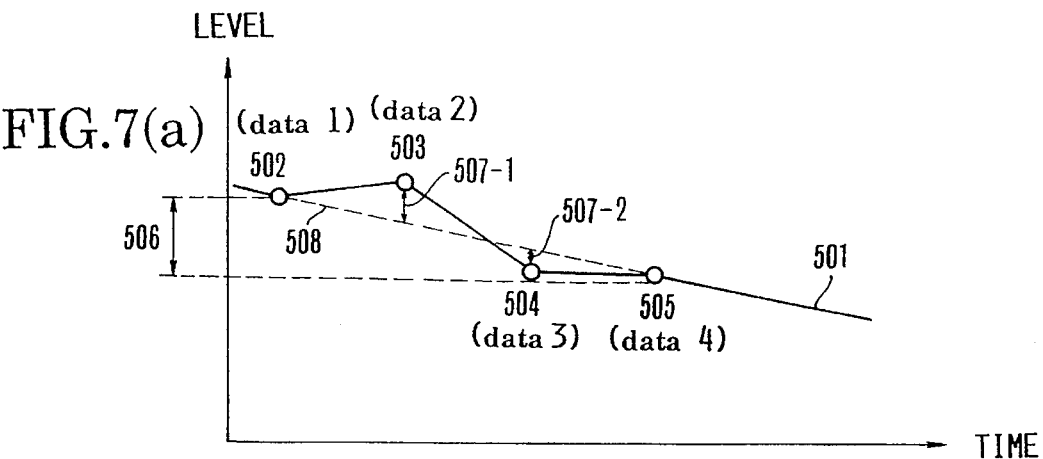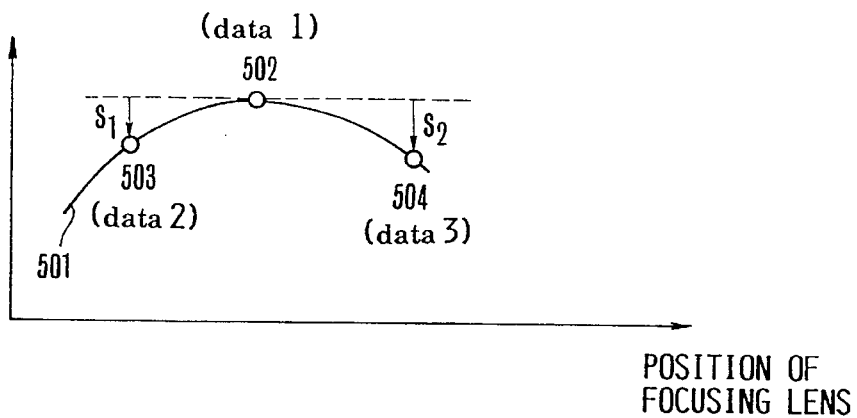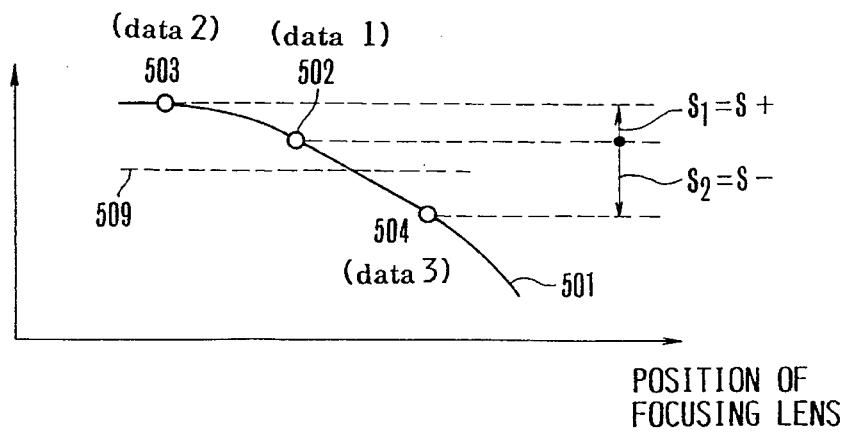

(RULE 1)
IF     TEMPORAL CHANGE IS BIG —————————————— (1)
      OR
      CHANGE OF INPUT INFORMATION IS BIG ———— (2)
THEN
      OUT OF FOCUS (RULE 2)
IF     DEGREE OF CONVEXITY TOWARD ABOVE IS BIG ———— (3)
      OR
      NEAR PEAK ———————————————————————— (4)
THEN
      IN FOCUS

IN THE ABOVE RULES:
(1) |data 4 − data 1| IS BIG ⇒ FIG.8(a)
(2) DIFFERENCE BETWEEN PRESENT INPUT DATA AND LATEST PAST DATA AT THE TIME OF IN-FOCUS IS BIG ⇒ FIG.8(b)
(3) WHEN
    data 2 − data 1 = $S_1 < 0$
    AND
    data 3 − data 1 = $S_2 < 0$,
    $|S_1| + |S_2|$ IS BIG ⇒ FIG.8(c)
(4) WHEN
    data 2 − data 1 = $S_1 > 0$ AND data 3 − data 1 = $S_2 < 0$
    OR
    data 2 − data 1 = $S_1 < 0$ AND data 3 − data 1 = $S_2 > 0$,
    POSITIVE ONE S+ OF $S_1$ AND $S_2$ IS SMALL ⇒ FIG.8(d)
    NEGATIVE ONE S− OF $S_1$ AND $S_2$ IS SMALL (ABSOLUTE VALUE IS BIG) ⇒ FIG.8(e)

FIG.12 (Table-1)

(RULE 1)
IF    POWER ZOOM (WIDE → TELE) = LONG TIME
      AND
      CHANGE OF INPUT INFORMATION = BIG OR MIDDLE
THEN OPERATE FOCUS MOTOR CONTROL LOOP (RULE 2)
IF    POWER ZOOM (WIDE → TELE) = SHORT TIME
      AND
      CHANGE OF INPUT INFORMATION = MIDDLE OR BIG
THEN OPERATE TRIAL ROUTINE (RULE 3)
IF    POWER ZOOM (WIDE → TELE) = SHORT TIME
      AND
      CHANGE OF INPUT INFORMATION = SMALL
THEN OPERATE INPUT INFORMATION CHANGE DETECTING ROUTINE

FIG.13 (Table-2)

(RULE 0)   IF    NORMALIZED EDGE SIGNAL == BIG
                 &&
                 DIFFERENTIAL VALUE OF NORMALIZED EDGE SIGNAL == Zo
           THEN  FOCUS MOTOR = STOP (RULE 1(7))  IF  FOCUS MOTOR == INFINITE DISTANCE (NEAREST)
                 &&
                 HIGH-FREQUENCY SIGNAL == SMALL
                 &&
                 DIFFERENTIAL VALUE OF HIGH-FREQUENCY SIGNAL == P-Small
             THEN FOCUS MOTOR = INFINITE DISTANCE (NEAREST) → HIGH SPEED (RULE 2(8))  IF  FOCUS MOTOR == INFINITE DISTANCE (NEAREST)
                 &&
                 HIGH-FREQUENCY SIGNAL == SMALL
                 &&
                 DIFFERENTIAL VALUE OF HIGH-FREQUENCY SIGNAL == N-Small
             THEN FOCUS MOTOR = NEAREST (INFINITE DISTANCE) → HIGH SPEED (RULE 3(9))  IF  FOCUS MOTOR == INFINITE DISTANCE (NEAREST)
                 &&
                 HIGH-FREQUENCY SIGNAL == SMALL
                 &&
                 DIFFERENTIAL VALUE OF HIGH-FREQUENCY SIGNAL == P-Big
                 &&
                 DIFFERENTIAL VALUE OF NORMALIZED EDGE SIGNAL == P-Small
             THEN FOCUS MOTOR = INFINITE DISTANCE (NEAREST) → MIDDLE SPEED FIG.19(a) (Table-3)

(RULE 4(10))   IF    FOCUS MOTOR = = INFINITE DISTANCE (NEAREST)
                     &&
                     HIGH-FREQUENCY SIGNAL = = SMALL
                     &&
                     DIFFERENTIAL VALUE OF HIGH-FREQUENCY SIGNAL = = N-Big
                     &&
                     DIFFERENTIAL VALUE OF NORMALIZED EDGE SIGNAL = = N-Small
               THEN  FOCUS MOTOR = NEAREST (INFINITE DISTANCE) ⟶ MIDDLE SPEED (RULE 5(11))   IF    FOCUS MOTOR = = INFINITE DISTANCE (NEAREST)
                     &&
                     NORMALIZED EDGE SIGNAL = = BIG
                     &&
                     DIFFERENTIAL VALUE OF NORMALIZED EDGE SIGNAL = = P-Big
               THEN  FOCUS MOTOR = INFINITE DISTANCE (NEAREST) ⟶ LOW SPEED (RULE 6(12))   IF    FOCUS MOTOR = = INFINITE DISTANCE (NEAREST)
                     &&
                     NORMALIZED EDGE SIGNAL = = BIG
                     &&
                     DIFFERENTIAL VALUE OF NORMALIZED EDGE SIGNAL = = N-Big
               THEN  FOCUS MOTOR = NEAREST (INFINITE DISTANCE) ⟶ LOW SPEED FIG.19(b) (Table-3-continued)

AUTOMATIC FOCUSING SYSTEM WITH RESPONSE CONTROL USING FUZZY INTERFERENCE

This is a continuation application under 37 CFR 1.62 of prior application Ser. No. 08/199,980, filed Feb. 22, 1994 (aban.), which is a continuation of Ser. No. 08/049,623, filed Apr. 19, 1993, abandoned, which is a continuation of Ser. No. 07/905,156, filed Jun. 24, 1992 (aban.), which is a continuation of Ser. No. 07/578,024, filed Sep. 5, 1990 (aban.).

BACKGROUND OF THE INVENTION

1. Field of the Invention

This invention relates to a video camera and more particularly to the automatic focusing (hereinafter occasionally abbreviated to AF) system of a video camera.

2. Description of the Related Art

The video apparatuses such as video cameras have conspicuously advanced during recent years. Their sizes have been reduced. They have come to be arranged to more automatically operate and to have more versatile functions. As a result of the advancement, almost all the video cameras are normally provided with an automatic focus adjustment (or focusing) system these days.

Automatic focus adjustment systems are provided in varied kinds. Unlike a still camera which is arranged to be used in taking a still picture, a video camera is required to be continuously focused on a moving object. It is, therefore, essential for the video camera to be capable of retaining its in-focus state for a moving object.

The performance of the automatic focusing system may be evaluated, in this respect, in terms of stability and quick responsivity. The stability means that a focusing lens is not unnecessarily operated. In other words, it means that no faulty action that causes a blur by unnecessarily moving the focusing lens for focusing occurs. The quick responsivity means that the focusing lens is promptly moved to an in-focus position by correctly determining the direction and speed of the focusing action. The automatic focusing system for a motion picture must be arranged to meet these requirements in a well balanced state and to be capable of responding to any change of an image at a speed apposite to the change. To meet these requirements, the system must have information on the current state of focus and also accurate control information on the operating direction and speed of a focusing motor.

It is a general tendency of these days that the video camera is arranged to extract a signal component which varies with the state of focus from an image signal and to adjust focus on the basis of the signal component extracted. This method permits focus adjustment irrespective of the distance at which a photographed object is located. The automatic focusing systems of the kind obtaining the above-stated information from the image signal can be roughly divided into two kinds. One employs an optical path modulating method which detects focus by modulating an optical path. The other uses a trial method.

In the modulating method, the optical path is modulated by periodically vibrating a lens or an image sensor or the like by means of a piezoelectric element or the like. Information on the result of a discrimination made between a near-focus state, a far-focus state and an in-focus state is thus actively obtained. While it is an advantage of this method that information on the current state of focus and on the driving direction of the focusing motor can be accurately and promptly obtained, a disadvantage of it lies in the addition of the piezoelectric element and a driving circuit for it, which necessitates a complex structural arrangement and an increase in cost of the automatic focusing (AF) system.

In the case of the trial method, AF control information on the focusing lens shifting direction and a focused state, etc., is obtained from changes caused in the image signal by driving the focusing motor. That method is called the trial method as the focusing lens is first tentatively moved to a very small extent. Unlike the modulation method, the trial method permits preparation of the AF system at a low cost as it requires no complex arrangement. However, it is a disadvantage of the trial method that it requires a longer operating time than the modulation method. Another disadvantage of the method resides in an increased probability that a temporal change taking place in the image is undistinguishable from a change brought about by the tentative (or trial) focusing action. Therefore, the control information obtained by that method tends to become ambiguous.

In the event of binary control performed by simply comparing the focus control information with a threshold value, a faulty determination would often be made in accordance with the trial method, if restart of focusing is determined after attainment of an in-focus state. In such a case, the focusing motor would restart despite the in-focus state to greatly degrade picture quality by blurring an image from an in-focus state.

Patent applications filed prior to the present invention relative to automatic focusing include, among others, U.S. Pat. No. 4,762,986 and U.S. Pat. No. 4,804,831 and U.S. patent applications Ser. No. 017,183 filed on Feb. 19, 1987, Ser. No. 046,252 filed on May 5, 1987 and Ser. No. 121,624 filed on Nov. 17, 1987.

SUMMARY OF THE INVENTION

This invention is directed to the solution of the above-stated problems of the prior art. It is, therefore, a first object of the invention to provide an automatic focusing system which is capable of always accurately continuing a focusing action on any object that changes in a complex manner.

It is a second object of the invention to provide an automatic focusing system which is of the kind obtaining focus control information from an image signal and is capable of performing optimum control by making a fuzzy inference in processing ambiguous information.

To attain this object, an automatic focusing system arranged as a preferred embodiment of the invention comprises: detecting means for detecting from an image signal a signal component which varies with the state of focus; computing means for computing and producing output control information by computing a degree to which information based on the signal component detected by the detecting means conforms to preset conditions; and focus control means for adjusting focus on the basis of an output of the computing means.

It is a third object of the invention to provide an automatic focusing system which is of the kind obtaining focus control information from an image signal and is arranged to be capable of appositely determining a restart of focusing by evaluating information in a state of being allowed to include ambiguities and by evaluating information of varied kinds in an organically combined state.

It is a fourth object of the invention to provide an automatic focusing system which is of the kind obtaining focus control information from an image signal and of the trial type having many ambiguities included in the information, the system being arranged to be capable of high reliably and stably carrying out optimum control in a manner suited to the human sensation of the operator. The system is capable of appositely determining a restart of focusing by evaluating the information in a state of including ambiguities by a focus motor restart determining algorithm to which a fuzzy inference algorithm of evaluating information of varied kinds in an organically combined state is applied. This eliminates the possibilities that the focusing lens is not moved when there obtains an out-of-focus state and that the quality of images deteriorates because of a poor responsivity.

To attain the fourth object, an automatic focusing system which is of the kind obtaining focus control information from an image signal and is arranged as a preferred embodiment of this invention comprises: focus control means for adjusting focus on the basis of a given signal component which is extracted from an image signal and varies with the state of focus; and restart determining means for restarting the focus adjustment according to a change in the state of focus after the focus adjusting action of the focus control means comes to a stop with an in-focus state attained, the restart determining means being arranged to compare, with preset conditions, detected information including the signal component which varies with the state of focus and to determine a restart of the focus adjusting action of the focus control means on the basis of a degree to which the detected information conforms to the preset conditions.

It is a fifth object of the invention to provide an automatic focusing system which obtains focus control information from an image signal by a trial method including many ambiguities in the information and is capable of adequately performing a focusing action in a manner agreeable to the human sensation, the system being arranged to control the speed of a focus motor by an algorithm which evaluates the information in the state of including the ambiguities and being organically combined with other information of varied kinds.

It is a sixth object of the invention to provide an automatic focusing system which is of the kind obtaining focus control information from an image signal and is arranged to control the speed of a focus motor with a fuzzy inference algorithm applied for the control. The arrangement enables the system to evaluate the state of focus by using focus detecting information in a state of including ambiguities and also in a state of being organically combined with information of varied kinds, so that a focusing speed can be set at a speed apposite to each of various situations. Therefore, the system has a good responsivity and is capable of performing optimum control over an automatic focusing action in a manner reliable, stable and apposite to the sensation of the operator.

To attain the above-stated object, an automatic focusing system arranged as a preferred embodiment of the invention comprises: focus detecting means for detecting the state of focus on the basis of a signal component which is extracted from an image signal and varies with the state of focus; and speed control means for controlling the speed of focus adjustment on the basis of an output of the focus detecting means, the speed control means including computing means which is arranged to compare detected information on the signal component with conditions preset for the detected information and to set the speed of focus adjustment of the basis of a degree to which the detected information conforms to the preset conditions.

It is a seventh object of the invention to provide an automatic focusing system wherein a plurality of pieces of information based on a signal component extracted from an image signal and indicating the states of focus are checked for the degree to which they conform to a plurality of preset rules; and the system is arranged never to be incapable of controlling even in cases where they fail to conform to any of the preset rules.

To attain the above-stated object, an automatic focusing system which is arranged as a preferred embodiment of the invention comprises: focus detecting means for detecting the state of focus on the basis of a signal component which is extracted from an image signal and varies with the state of focus; speed control means arranged to compare detected information on the signal component with conditions preset for the detected information and to set a focus adjusting speed on the basis of a degree to which the detected information conforms to each of the preset conditions; and escaping means for escaping the control of the speed control means when the detected information fails to conform to any of the preset conditions.

It is an eighth object of the invention to provide an automatic focusing system including detecting means for detecting a signal component which is extracted from an image signal and varies with the state of focus; speed control means for controlling a focus adjusting speed on the basis of information detected by the detecting means; and restart determining means for determining whether or not a focus adjusting action is to be resumed after an in-focus state is detected on the basis of the detected information. The system has at least one of the speed control means and the restart determining means arranged to use a computing algorithm for computing the amount of control on the basis of a degree to which the detected information conforms to preset rules. This arrangement enables the system to accurately perform focus control in a manner natural for the human sensation.

It is a ninth object of the invention to provide an automatic focusing system which is arranged to perform optimum focus control by using a fuzzy inference for a control mode determining routine which determines a control mode between a focus control mode and a trial focusing mode according to the change of input information.

These and other objects and features of the invention will become apparent from the following detailed description of embodiments thereof taken in connection with the accompanying drawings.

BRIEF DESCRIPTION OF THE DRAWINGS

FIGS. 7(a), 7(b) and 7(c) show actions performed for taking in the input control information.

FIG. 12 is a condition setting table which is provided for determining the state of focus.

FIG. 13 shows a condition setting table to be used for collating control conditions with input information in the control algorithms of FIGS. 10, 11(a) and 11(b).

FIGS. 19(a) and 19(b) show a rule setting table to be used for a speed control algorithm according to the invention.

DETAILED DESCRIPTION OF THE PREFERRED EMBODIMENTS

Figure 1:
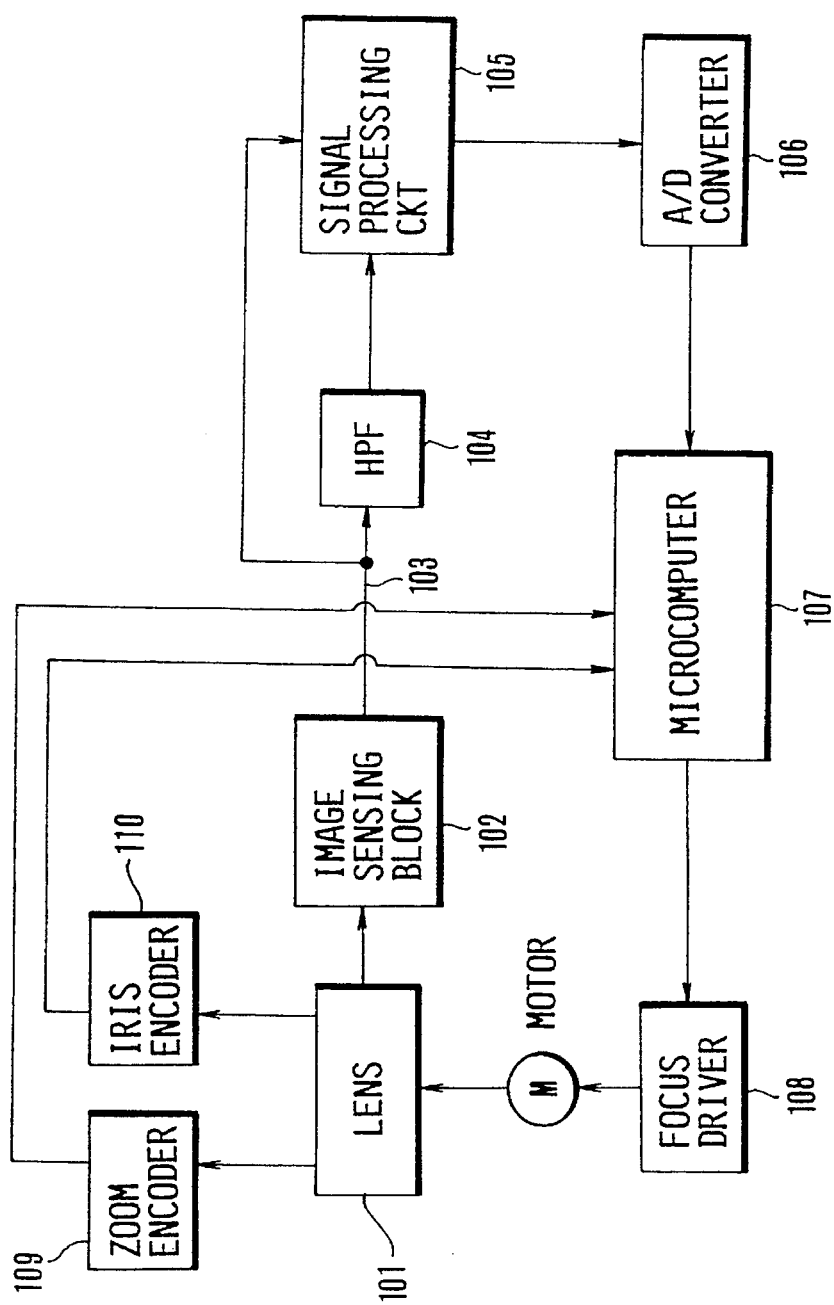
FIG. 1 is a block diagram showing the arrangement of an automatic focusing system which is arranged according to this invention as a first embodiment thereof.

The details of the automatic focusing system of this invention are described below through the embodiments thereof with reference to the drawings:

FIG. 1 shows in a block diagram the arrangement of the automatic focusing system of a video camera embodying this invention as a first embodiment thereof. Referring to FIG. 1, incident light coming through a focusing lens 101 is converted into an image signal 103 by an image sensing block 102 which consists of an image sensor and a signal processing circuit. The image sensor is a CCD or the like. The signal processing circuit is arranged to process the signal of the image sensor. The image signal 103 is supplied to a signal processing circuit 105 directly thereto and also indirectly through a high-pass filter 104. The signal processing circuit 105 is arranged to produce a high-frequency signal component which is used as focus information for determining the focused state of image, a normalized edge signal and a composite signal of them.

The normalized edge signal indicates the width of the edge part of the contour or the like of the image of an object formed on the image sensing plane of the image sensor. The value of the edge signal decreases accordingly as the focusing lens comes closer to an in-focus point. This signal permits focus detection to be made at a high degree of accuracy as it is not affected by the contrast of the object. The details of arrangement for obtaining the edge signal has been disclosed in U.S. Pat. No. 4,804,831. Therefore, the arrangement is omitted from the following description.

An A/D (analog-to-digital) converter 106 is arranged to A/D-convert these signals and to supply the digital signals thus obtained to a microcomputer 107. The microcomputer 107 is arranged to determine, according to these signals, the driving speed of a focus motor M which is provided for driving the focusing lens and to control the focusing lens 101 through a focus driver 108. In determining the driving speed of the focus motor M, the microcomputer 107 computes a depth of field as sub-information. For this purpose, the microcomputer 107 obtains focal length data and aperture value data from a zoom encoder 109 and an iris encoder 110 respectively for use in computing the speed at which the focusing lens 101 is to be moved. This is because, in adjusting focus, the sensitivity of position of the focusing lens varies with the depth of field.

Figure 2:
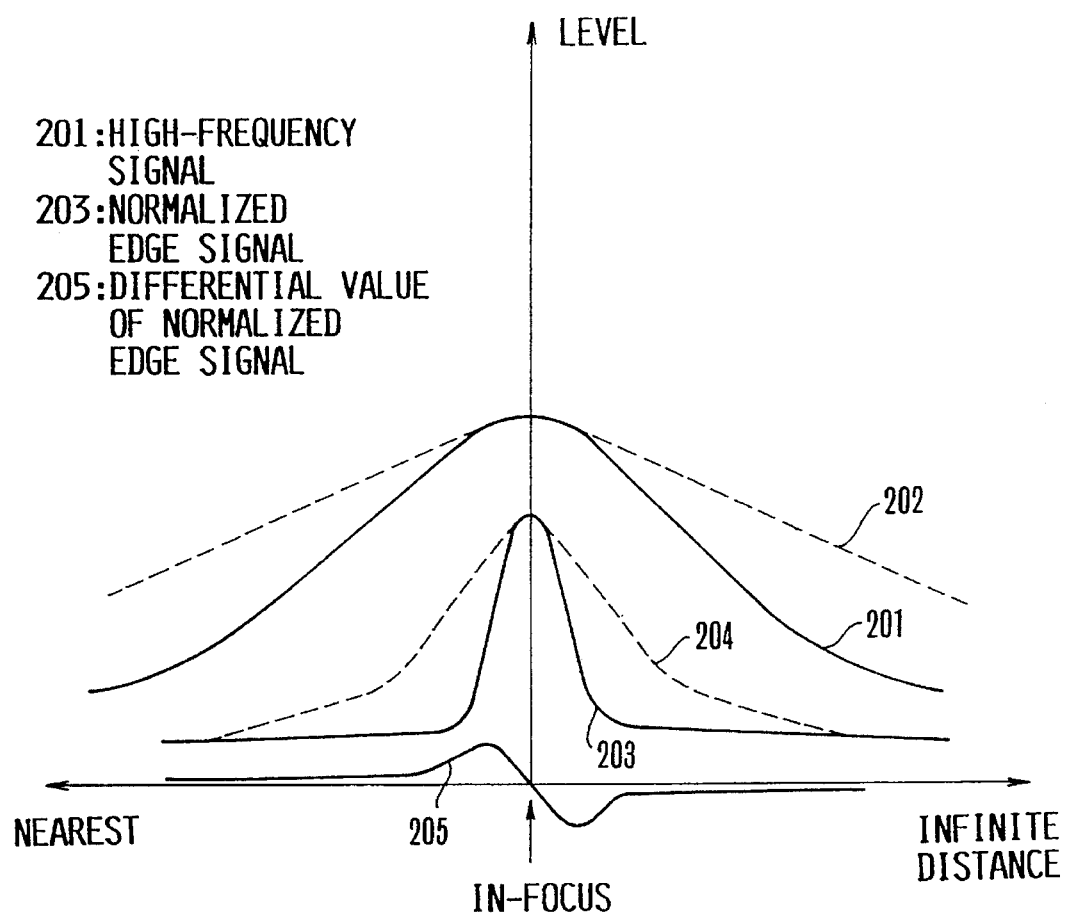
FIG. 2 is a graph showing the characteristic of a focus control signal which changes according to the state of focus.

The variation characteristics of the high-frequency signal component and the normalized edge signal which are obtained by the signal processing circuit 105 in relation to the position of the focusing lens are as shown in FIG. 2. Referring to FIG. 2, a reference numeral 201 denotes the variation characteristic of the high-frequency signal component of the image (video) signal and a numeral 203 that of the normalized edge signal. The above-stated high-frequency signal component is a component of a luminance signal extracted by the high-pass filter (HPF) 104. The normalized edge signal is obtained, as described in detail in U.S. Pat. No. 4,804,831 referred to above, Japanese Laid-Open Patent Application No. SHO 63-128878, etc., by computing a signal component corresponding to the width of the edge part of an object image obtained by normalizing, with the contrast of the object image, a differential value which is obtained by differentiating the high-frequency signal component having passed through the HPF.

All these signals reach their peaks when an in-focus state is attained. The focus control, therefore, can be carried out as a rule by driving the focusing lens toward the peak in a hill-climbing manner. Further, the edge width signal reaches a minimum value at an in-focus point. The actual process is, therefore, carried out by using the reciprocal of it in such a way as to have the reciprocal at a maximum value at the in-focus point.

A difference between the high-frequency signal component and the normalized edge signal lies in the steepness of peak in the neighborhood of the in-focus point. The normalized edge signal forms a steep peak only in the neighborhood of the in-focus point and seldom forms any hill like shape at points greatly deviating from the in-focus point. This gives reliable information for focus detection. Meanwhile, the high-frequency signal component information moderately forms a peak. Therefore, the high-frequency signal component information is set in such a way as to make the focusing lens driving direction readily determinable even in the event of an excessively blurred state of the image.

A reference numeral 205 denotes a differential value of the normalized edge signal obtained when the focusing lens 101 is moved toward the infinite distance. This value comes to a peak in the neighborhood of the in-focus point. The differential value of the normalized edge signal is used in deciding the focusing lens to be brought to a stop when an in-focus state is attained.

Broken line curves 202 and 204 represent the characteristics of the high-frequency signal component and the normalized edge signal obtained in the event of the deep depth of field respectively. In that event, their characteristic curves become flatter to show more moderate inclinations. In cases where the depth of field becomes deeper, therefore, the control data which is set on the basis of the normal characteristic curves 201 and 203 must be corrected according to the change of inclination.

Figure 3A:
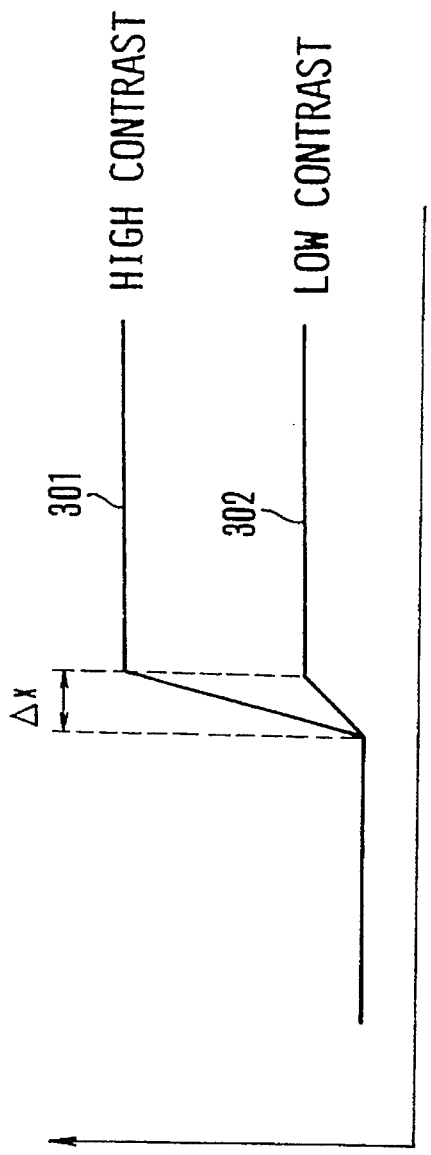
FIGS. 3(a) and 3(b) are graphs for explaining a normalized edge signal.
Figure 3B:
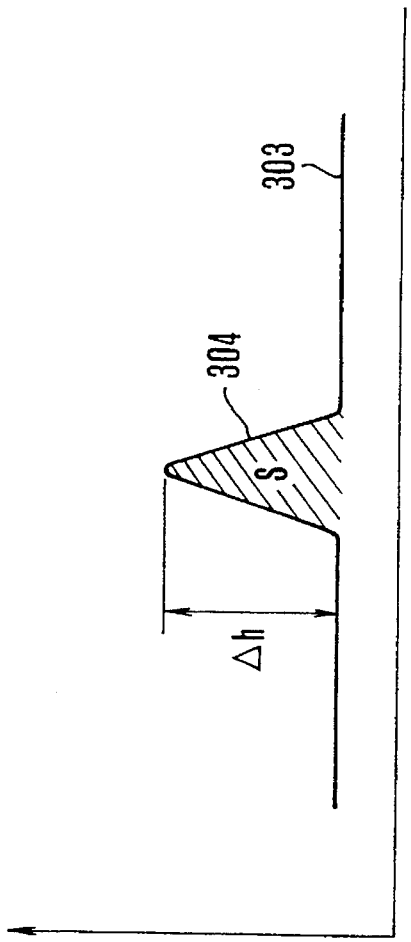

Information on the normalized edge is further described as follows: FIG. 3(a) shows an image signal representing an edge part of the image. FIG. 3(b) shows the differential waveform of the image signal. A reference numeral 301 denotes the waveform of signal level obtained when the contrast of the object is high and a numeral 302 a waveform obtained in the event of a low contrast. The information necessary for focus determination is represented by the width Δx of a slanting part. Considering this on the differential waveform 303 of FIG. 3(b), the height Δh of the slanting part depends on the contrast. Therefore, the area S of a hill part 304 having the peak point at its summit also depends on the contrast. Considering this waveform to be a triangle, the area S can be expressed as follows:

$$\Delta S = \Delta x . \Delta h$$

Therefore, $\Delta x = \Delta S / \Delta h$

The width Δx of the slanting part of the normalized edge which is independent of the contrast thus can be obtained. The signal processing circuit 105 performs this computing operation. However, since this circuit can be arranged in accordance with known arrangement as mentioned in the foregoing, the details of the circuit 105 are omitted from the description given herein.

Figure 4:
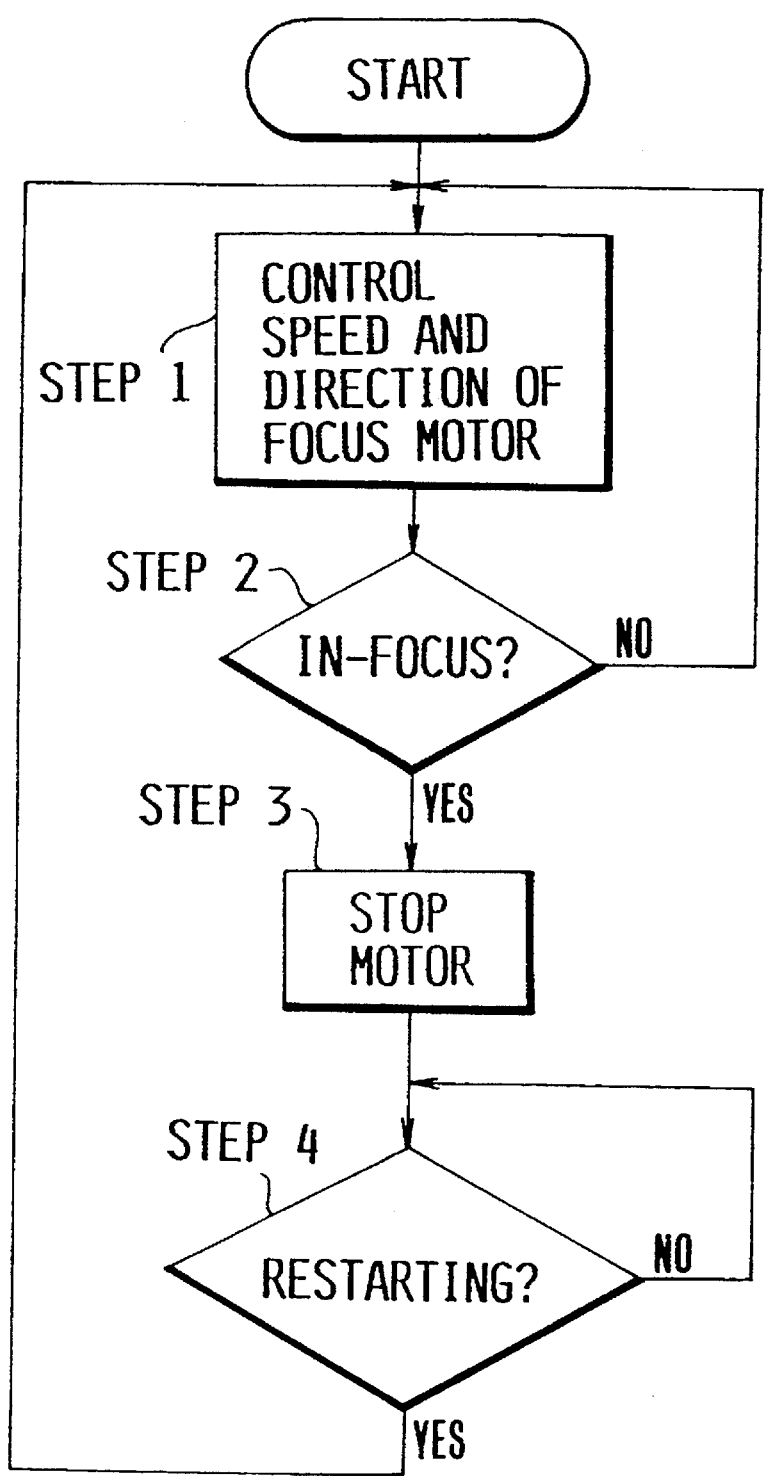
FIG. 4 is a flow chart showing the algorithm of control performed according to the invention.

FIG. 4 shows in outline the control algorithm to be used in accordance with this invention. Fundamentally, there are two control loops. One is a focus motor control loop which is executed as follows: At a step 1, the focus motor is controlled. At a step 2, a check is made for the state of focus. If an in-focus state is found, the flow of control comes to a step 3 to bring the motor to a stop. If not, the flow comes back to the step 1 to continue the motor driving control. The other is a restart determining loop, which is executed in the following manner: With the focus motor brought to a stop at the step 3 after detection of the in-focus state at the step 2, the flow comes to a step 4 to determine whether the motor is to be restarted by making a check for deviation from an in-focus point. In the actual control process, one round of either of the two control loops is carried out per field. The control loop is changed from one loop over to the other according to the result of each checking and determining routine.

The focus motor control routine of the step 1 is described as follows: This is a hill-climbing control action which is performed in accordance with the signal waveform of FIG. 2 as described in the foregoing. The direction in which the focusing lens is to be driven is determined on the basis of the high-frequency signal component. Then, an in-focus point is detected through the normalized edge signal.

In this instance, there is the following problem: In actual shooting, a noise or the object causes a local peak in the waveform. In other words, a peak of waveform arises in a position not intended by the camera operator to bring about a faulty action which is performed in such a way as to bring the focusing lens to a stop while a desired focusing object (or main object) is still out of focus. This is a serious drawback of the system. To avoid this, the focus motor control input information must be processed through a filter, an averaging process, etc. in such a way as to ensure that the control is made to climb the maximum peak hill without fail and that the motor is not readily brought to a stop at a local peak.

The motor stopping determination after attainment of an in-focus state is made by the in-focus state determining routine, i.e., a stop determining routine, of the step 2. This routine is executed as follows: The differential value 205 of the normalized edge signal which is as shown in FIG. 2 forms a peak immediately before the in-focus point. Therefore, a zero-crossing point obtained next to detection of the peak is assumed to be the in-focus point and the focus motor is brought to a stop accordingly. After stopping the focus motor, the flow of control comes to the restart determining loop of step 4.

The restart determining loop is executed as follows: The degree of blur of the object image is detected. Whether the focus motor is to be restarted or not is decided according to the result of the blur detection. During the process of this loop, a discrimination must be accurately made between an in-focus state and a defocus state. If the probability of mistaking a blurred state for an in-focus state is high, the focus motor cannot be restarted despite the blurred state to give a serious result. If the probability of restarting the motor by mistaking an in-focus state for a defocus state is high, the focusing action becomes unstable to degrade the picture quality. To avoid this, in the restart determining loop, a discrimination between an in-focus state and a defocus state is made by changing the focusing lens to a very small extent after detection of any change of image through a change in the input information. The algorithm of this control operation is shown in FIG. 5.

Figure 5:
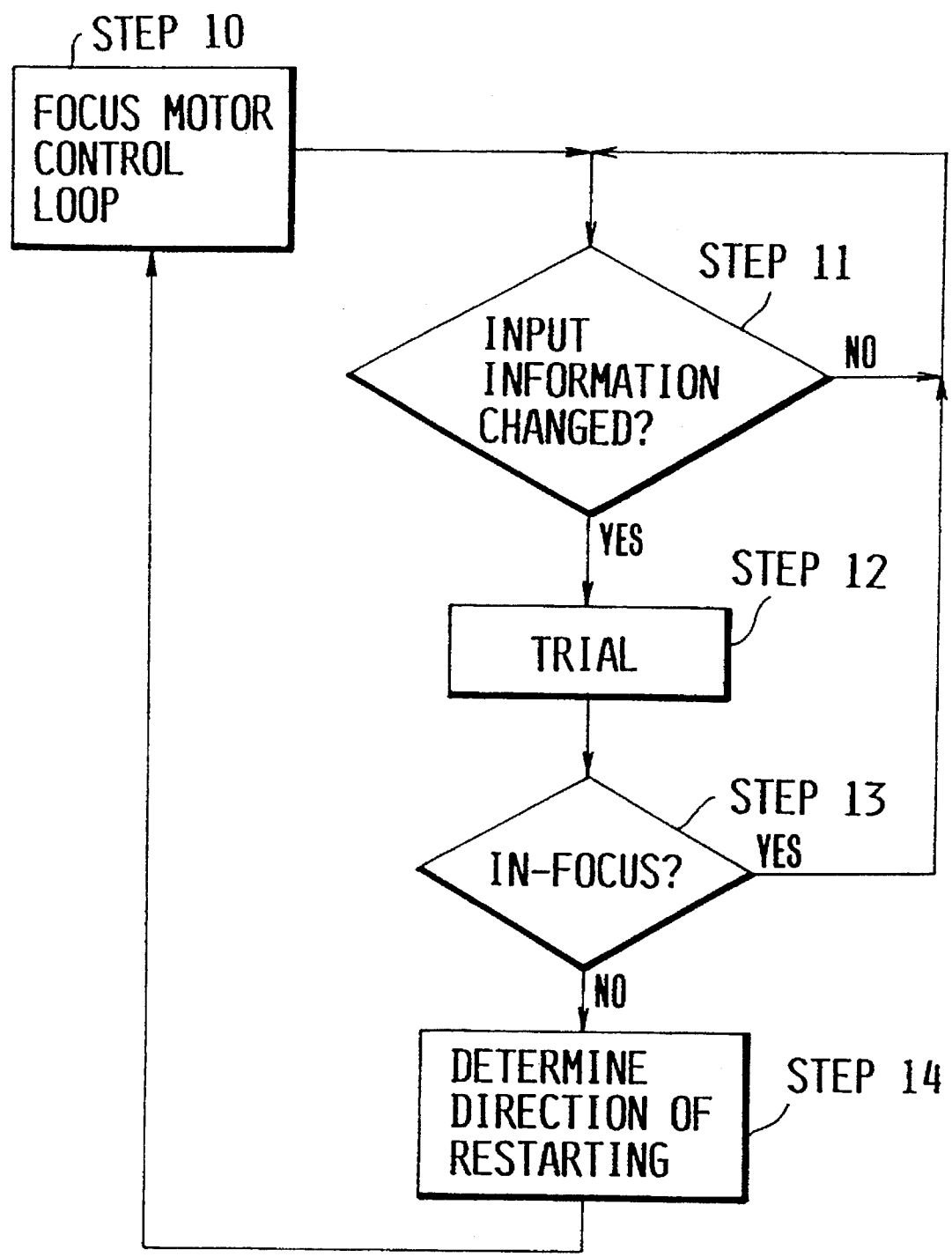
FIG. 5 is a flow chart showing the algorithm of restart control performed according to the invention.

In FIG. 5, a step 10 shows a focus motor control loop which consists of the steps 1 and 2 of FIG. 4. In a case where the input information used for detecting the state of focus changes after the focus motor is brought to a stop with an in-focus state attained, this change is detected at a step 11 by an input information change detecting routine. Then, the flow of control comes to a step 12 to make trial focus adjustment by a trial routine. In the trial routine, the focusing lens is tentatively moved to a slight extent in either direction. The current state of focus is detected by tentatively changing it. In other words, focus determining information is sampled by this action to find whether or not the current position of the focusing lens is located at the peak of the hill of the curve.

Figure 6:
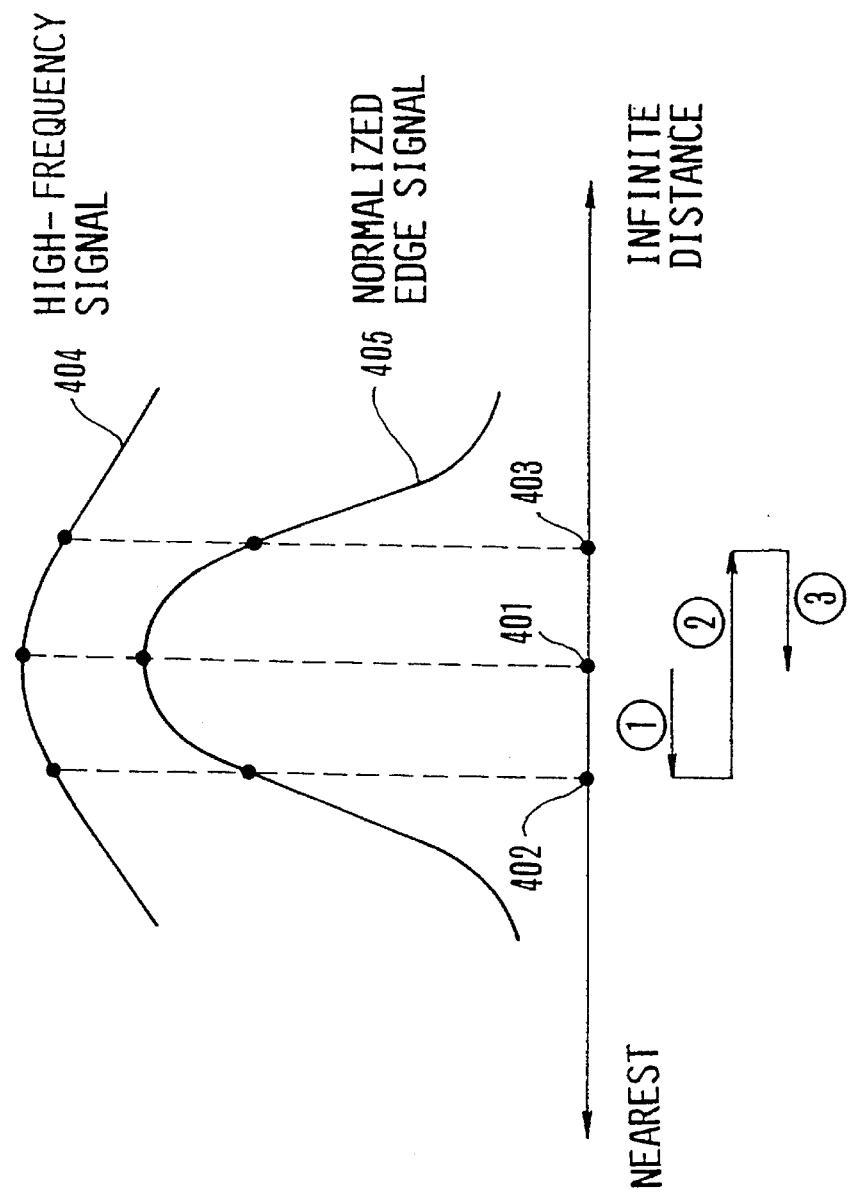
FIG. 6 shows the characteristic of input control information to be used for determining the state of focus.

This determining routine is further described as follows with reference to FIG. 6: Referring to FIG. 6, the level of the high-frequency signal component 404 obtained in the current focus position 401 and that of the normalized edge signal 405 are first sampled respectively. Next, the position of the focusing lens 101 is slightly moved in the direction of arrow (1) and the data of each of the signals (or the above-stated levels) is sampled at a focus position 402 obtained in the lens moving direction. After that, the lens is again slightly moved in the directions of arrows (2) and (3). Then, the data of each signal is likewise sampled. At the point 401, the data of each signal is sampled first and last and thus sampled twice. After sampling, the flow of control comes to a step 13. At the step 13: An in-focus state determining routine is executed by using the data obtained at the above-stated four sampling points.

In the in-focus state determining routine of the step 13, an inferential discrimination is made between an in-focus state and a defocus state on the basis of the four pairs of data obtained by the above-stated trial process and a change or difference from the latest past data obtained in the in-focus state (i.e., the change of input information). When the lens is determined to be in an in-focus position, the flow comes back to the step 11 to make a check for any change of the input information. If no change is found, the flow comes to the step 14 to set the direction of restart by executing a restart direction determining routine. After the step 14, the flow comes back to the step 10 to restart the driving action on the focusing lens by executing the focus motor control loop.

In the in-focus state determining routine, if there is no temporal change in the image, a set of data are determined in an upward convex pattern for a change in the state of focus as shown by way of example in FIG. 6. It is, however, important for an actual AF system to have an adequate dynamic characteristic, that is, to have an adequate responsivity to temporal changes taking place in the image and the input information. This relates not only to quick responsivity but also to the capability for repulsing unnecessary disturbances and to stably operate.

In actuality, some temporal changes, etc., are included in the set of data obtained by the trial focus adjustment. To be exact, accurate focus determination is difficult in many cases. The factors possibly included in the set of data obtained by the trial focus adjustment are as listed below:

(1) Changes in focus: Minute focus fluctuations resulting from the trial focus adjustment.

(2) Temporal changes of image (changes in the object): Input information changes due to a change in contrast while the object distance remains unchanged.

(3) Temporal changes of image (changes in distance).

(4) Zooming, depth of field and noises.

It is only the factor (1) that is necessary for determining an in-focus state. However, it is difficult to accurately distinguish these factors (1) to (3) and the noise (4) from each other. It is only possible to infer them from the pattern of the input data. In other words, such uncertain factors can be regarded as always existing in cases where the object image continues to change in actual shooting.

To cope with such uncertain factors of the input data, the invented automatic focusing system is arranged to use the so-called fuzzy inference for the in-focus state determining routine of the step 13. FIG. 12 shows, as a table-1, some rules to be used in determining the state of focus on the basis of the fuzzy inference.

The formula of each condition part of these rules is described with reference to FIGS. 7(a), 7(b) and 7(c) as follows:

FIG. 7(a) shows on a time axis the data sampling pattern obtained by the trial focus adjustment. In FIG. 7(a), a reference numeral 501 denotes input data indicating the state of focus. In other words, the data 501 gives information on the level of the high-frequency signal component or information on the normalized edge. Numerals 502 to 505 respectively denote the above-stated data sampling positions which temporally differ from each other. Hereinafter, these data are called data 1, data 2, data 3 and data 4, respectively. A broken line 508 in FIG. 7(a) shows a change which is assumed to take place when the trial focus adjustment, i.e., the tentative minute focus adjusting action, is not performed. Numerals 507-1 and 507-2 denote differences between the curve 508 and the data sampled by carrying out the trial focus adjustment. This indicates the factor resulting from the minute change in the state of focus, i.e., the minute movement of the focusing lens. However, these differences cannot be directly found. A numeral 506 denotes the amount of change taking place within a period of time between the start and the end of the trial focus adjustment.

In the table-1, a condition part (1) means the amount of the above-stated change 506 of FIG. 7(a). The length of time required for focusing increases accordingly as the amount of change 506 becomes bigger. Therefore, it is inferable that the probability of an out-of-focus state is high in cases where this amount is big.

A condition part (2) of the table-1 means a difference of the present input data value from input data value obtained at the latest point of time in the past in repeating the in-focus and stop determining process of the in-focus state determining routine, i.e., the motor stop determining routine of the focus motor control loop. The degree of change of the object may be considered to increase accordingly as this difference increases. It is, therefore, inferable that the probability of out-of-focus is high in cases where this difference is big.

A condition part (3) of the table-1 corresponds to the illustration given in FIG. 7(b). FIG. 7(b) shows the input data sampling pattern with the focusing lens position taken on the axis of abscissa like in the case of FIG. 6. It indicates that an in-focus state is attained at the peak of hill of the curve. A value S1=data 2–data 1 and a value S2=data 3–data 1 are of negative values while the initial point 502 of the trial focus adjustment is in a higher position to form a convex pattern toward above. In this instance, it is inferable that the hill is steeper and the degree of in-focus is greater accordingly as |S1|+|S2| is bigger than 0 to a greater extent.

A condition part (4) of the table-1 means a case where the data pattern is, unlike the condition part (3), not in the upward convex shape and the lens can be considered to be almost in an in-focus position in the neighborhood of the peak of the pattern as shown by way of example in FIG. 7(c). Referring to FIG. 7(c), this is a case where the level of the input data obtained at the focus point 502 is higher than a focusable limit level 509. In this case, the probability of an in-focus state increases accordingly as a value S+ in the positive direction is smaller and also a value S− in the negative direction is smaller (larger in absolute value).

In the case of FIG. 7(c), data 2 which is obtained at a sampling point 503 is larger than data 1 obtained at another sampling point 502. Therefore S1=S+ and S2=SΔ. However, this becomes S1=S− and S2=S+ in a case where the data 2 obtained at the sampling point 503 is smaller than the data 1 obtained at the point 502.

The focusable limit 509 cannot be unconditionally determined and is unmeasurable. However, it is possible to infer, by S+, whether the data obtained at the current sampling point 502 is larger or smaller than the focusable limit 509.

Figure 8A:
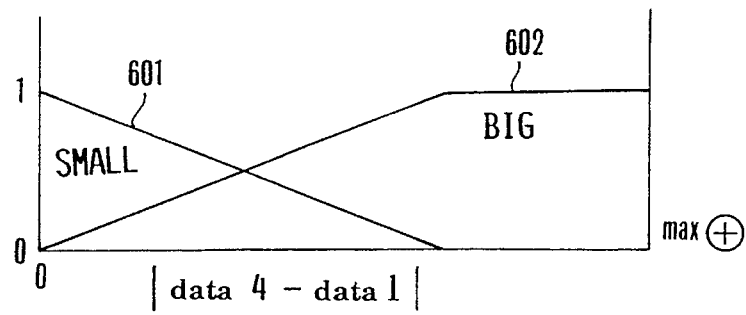
FIGS. 8(a) to 8(f) show membership functions to be used for control.
Figure 8B:
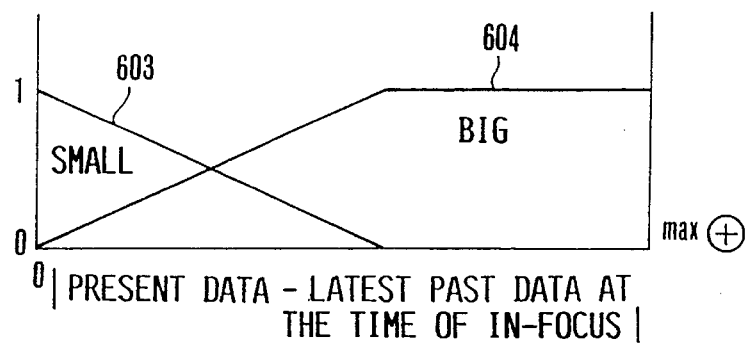
Figure 8C:
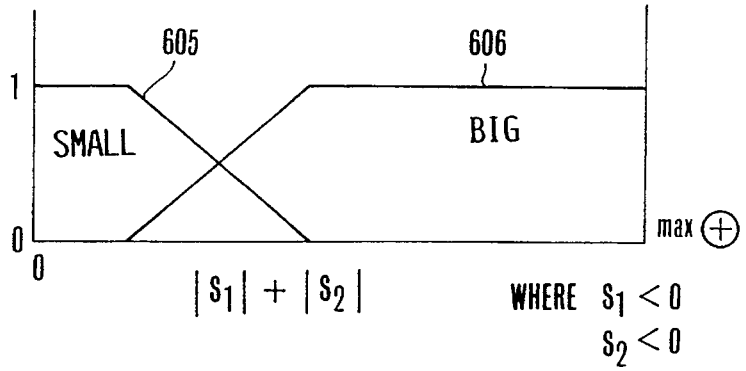
Figure 8D:
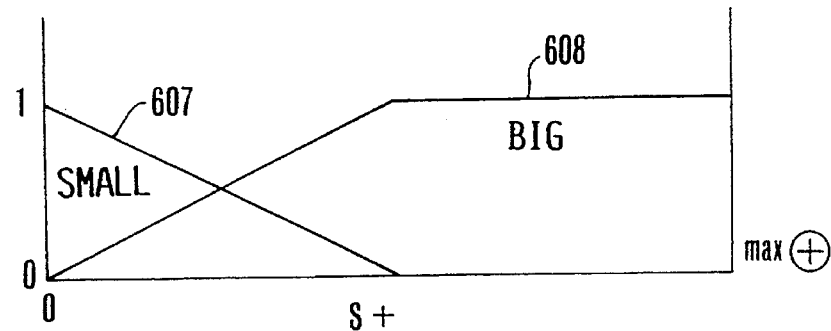
Figure 8E:
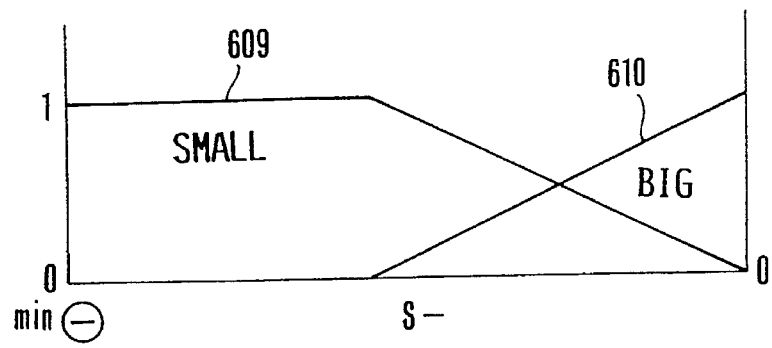
Figure 8F:
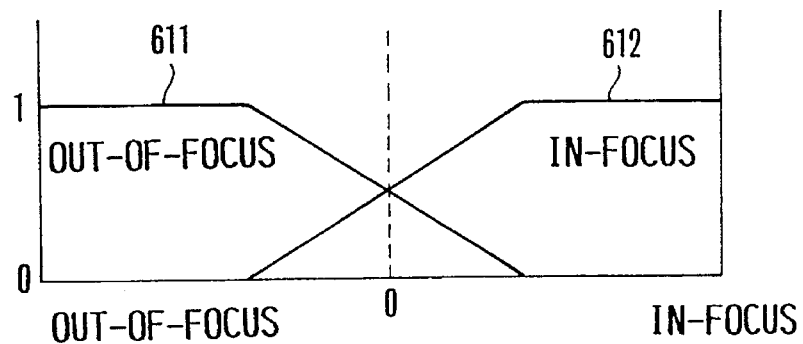

FIGS. 8(a) to 8(f) shows by way of example the shapes of the membership functions of this rule. The meaning of the membership function is apparent from the table-1. Referring to FIG. 8(a), functions 601 and 602 indicate the probability of a condition that a value |data 4–data 1| is small or big. In FIG. 8(b), functions 603 and 604 indicate the probability of a condition that |the present data–the latest past data obtained at the time of in-focus| is small or big. In FIG. 8(c), functions 605 and 606 indicate the probability of a condition that a value |S1|+|S2| is small or big. In FIG. 8(d), functions 607 and 608 indicate the probability of a condition that the value S+ is small or big. In FIG. 8(e), functions 609 and 610 indicate the probability of a condition that the value S− is small or big. In FIG. 8(f), output membership functions 611 and 612 indicate the probability of a condition for an out-of-focus state or an in-focus state.

Normally, values which conform to the rules are substituted for the input membership functions of FIGS. 8(a) to 8(e). Then, in the last place, an AND condition is obtained from the output membership functions of FIG. 8(f) and a centroid computing operation is carried out on functional areas which are formed on the output membership functions indicating the probability of satisfying the rules.

The computing operation on the conclusion part shown in FIG. 8(f) may be carried out by using membership functions like in the generally practiced fuzzy inference. In other words, the probability of each input membership function as to its conformity with the applicable rule is first obtained; and then, the barycenter of its external shape on the applicable output membership function is obtained by collating it with output membership functions. This system is arranged to produce an output simply showing either an in-focus state or an out-of-focus state. Therefore, the output may be obtained by simply comparing the evaluation values of the condition parts.

Next, the depth of field and the power zooming which define a shooting condition are described as follows: The depth of field is obtained by computation from a focal length detected by the zoom encoder 109 shown in FIG. 1 and an aperture value detected by the iris encoder 110. When the depth of field becomes deep, the high-frequency signal component and the normalized edge signal show moderate curves as represented by the curves 202 and 204 in FIG. 2. In this case, the width of a signal change resulting from a change in the state of focus is small. More specifically, the values of changes in the data sampled during the process of the trial focus adjustment are smaller when the depth of field is deep. Therefore, these values must be corrected. For that purpose, the input sample data values are subjected to a scaling process in such a way as to make them fit for the set membership functions. This process may be changed to adjust by scaling the axis of abscissa of the membership function in such a way as to compensate for changes taking place in the depth of field.

The depth of field becomes deeper at the time of power zooming, particularly on the wide-angle side. In that instance, the state of focus changes to a less degree in response to the same degree of movement of the focusing lens. Therefore, the speed of focusing must be increased for a higher following speed. For this purpose, the system is arranged to detect a power zooming action (zooming by means of a motor), to increase a defocus-state determining rate and to more readily restart the focus motor. To meet this requirement, the focusing rule of the table-1 is set as follows: Turning off of power zooming from a wide-angle position to a telephoto position (wide-to-tele) can be expressed by a binary value "1" or "0". The rule can be set as follows:

IF "the degree of convexity toward above is big or near the peak" and "power zoom (wide→tele) off"

THEN in focus

Figure 9:
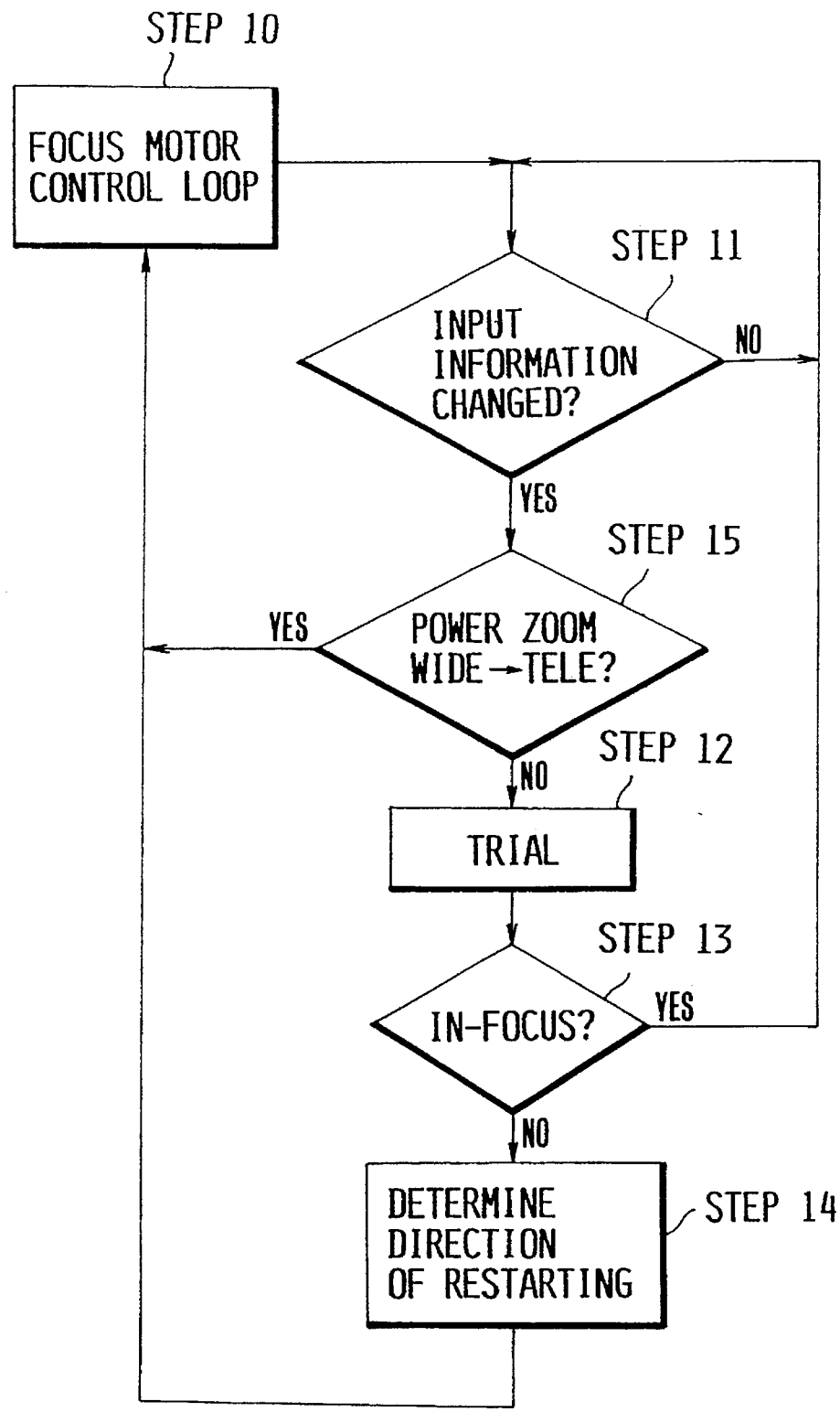
FIG. 9 is a flow chart showing the control algorithm of the control action of an automatic focusing system which is arranged as a second embodiment of the invention.

Or, the restart determining loop of the flow of control of FIG. 5 may be changed to insert in between the steps 11 and 12 a power zoom (wide-to-tele) detecting routine as a step 15 as shown in FIG. 9. Then, the control is performed in accordance with the flow of control as shown in FIG. 9, in which the same parts as those of FIG. 5 are indicated by the same step numbers.

Referring to FIG. 9, upon detection of power zooming from a telephoto position to a wide-angle position (tele-to-wide), the flow comes back to the step 10 which is a focus motor control loop. At the step 10, the focus motor is restarted. In a case where the state of focus is judged to be out of focus by an in-focus state determining routine, the flow comes to the step 14 to determine the direction of restart by executing a restart direction deciding routine. After that, the flow comes back to the step 10 for the focus motor control loop. In this instance, the value of data 2 and that of data 3 which are sampled during the process of the trial focus adjustment are compared with each other. Then, the restart is decided to be made in the direction of the bigger of the data 2 and 3.

In the case of the system described above, the fuzzy inference is used only for determining an in-focus state in the restart determining (deciding) loop. However, it is possible to let an input-information-change detecting routine perform a power zoom detecting function and to make a fuzzy inference for that function. An example of such arrangement is shown in a flow chart in FIG. 10, in which the same parts as those of FIGS. 5 and 9 are indicated by the same step numbers.

Figure 10:
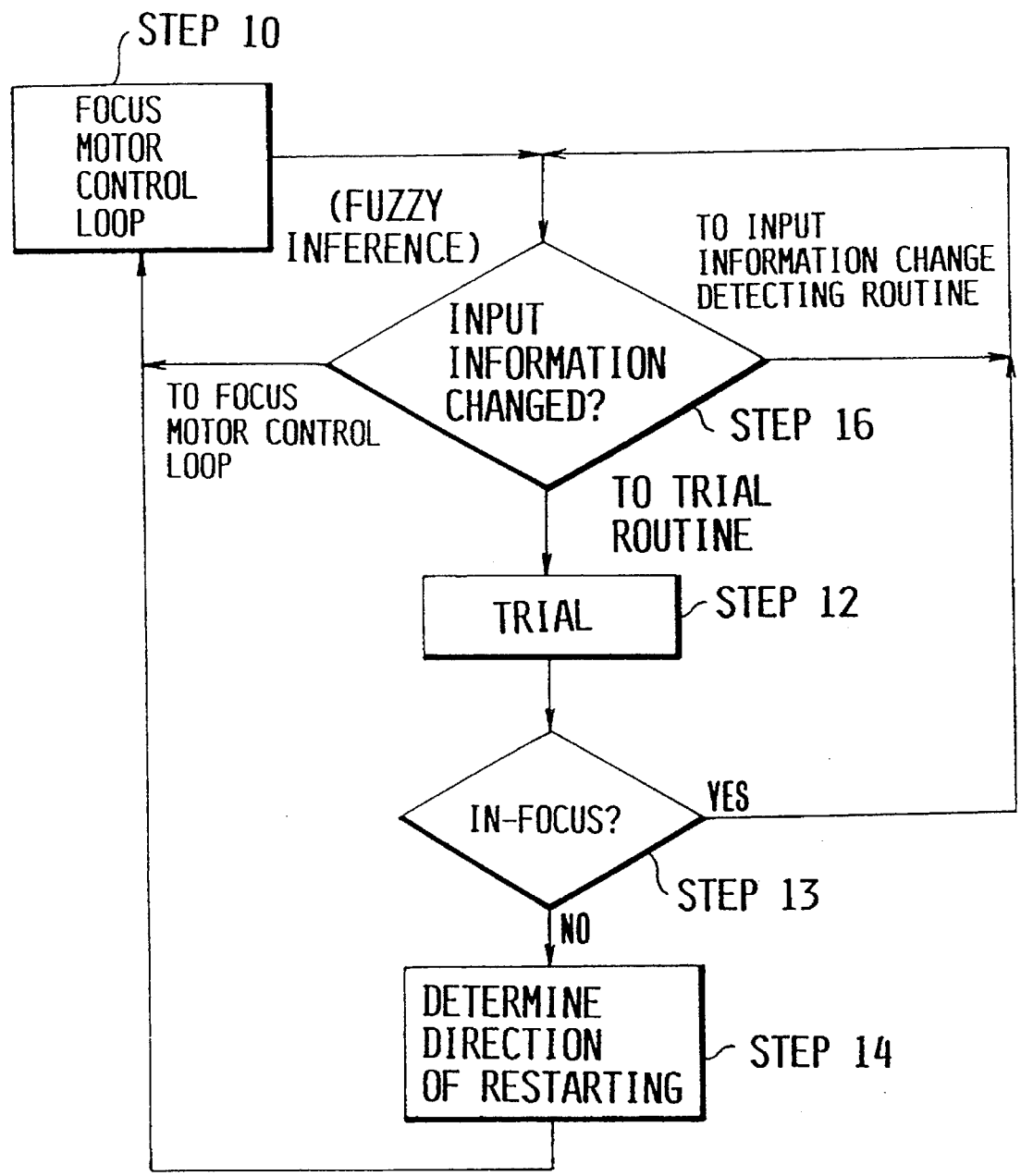
FIG. 10 is a flow chart showing the control algorithm of the control action of a third embodiment of the invention.

Referring to FIG. 10, a step 16 is provided for the above-stated input-information-change detecting routine. The fuzzy inference rules for this routine are set as shown in a table-2 in FIG. 13. Membership functions corresponding to these rules are approximately shown in FIGS. 11(a) and 11(b).

Figure 11A:
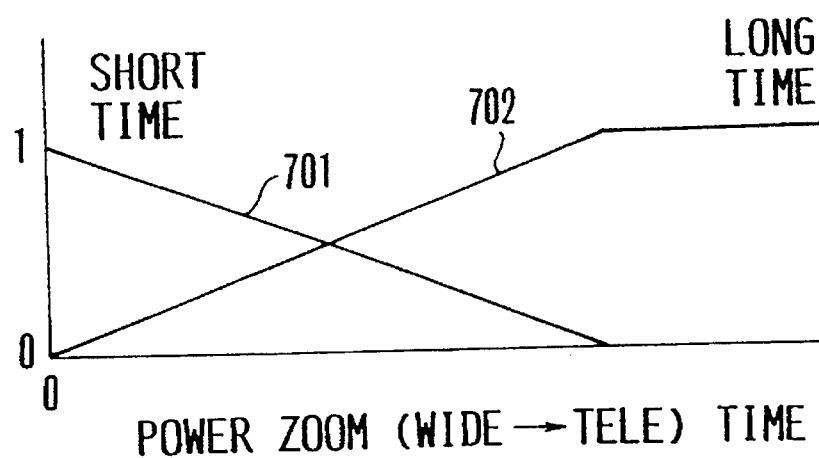
FIGS. 11(a) and 11(b) show membership functions related to the control algorithm of FIG. 10.
Figure 11B:
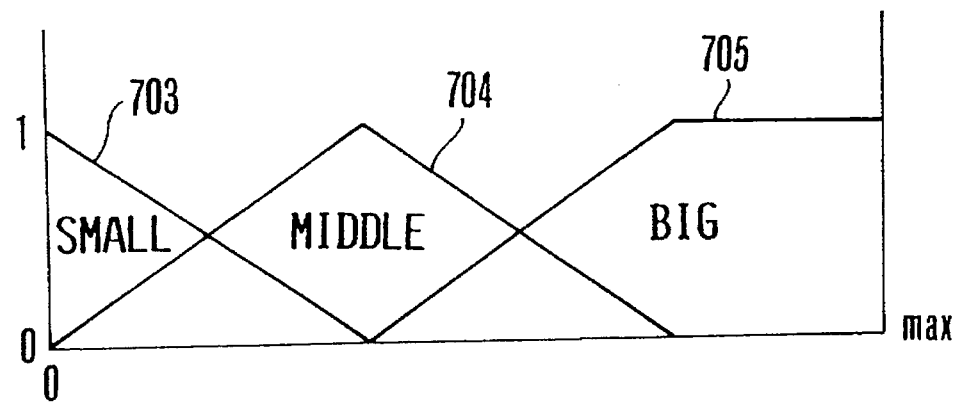

In FIG. 11(a), functions 701 and 702 indicate the probability of a condition that the time of wide-to-tele power zooming is short or long. The probability is obtained by applying the rules of FIG. 13 to the membership functions as applicable and is used in computing an output. In FIG. 11(b), functions 703, 704 and 705 indicate the probability of a condition that an input information change, i.e., the absolute value of a difference between the present data and the latest past data obtained at the time of in-focus, is small, middle or big. The probability is obtained by applying the rules of FIG. 13 to the membership functions as applicable and is used in computing an output.

Input data includes the time of wide-to-tele power zooming and the change of input information (|the present focus control data–the latest past data obtained at the time of in-focus|).

In the table-2, a rule 1 is provided for improving the capability of following a focus change due to zooming in cases where the input information is changed by wide-to-tele power zooming. In accordance with this rule, the system promptly comes back to the focus motor control loop. The rule 2 of the table-2 is provided for making the trial focus adjustment if the time of wide-to-tele power zooming is short when the input information changes either to a middle degree or to a big degree. The rule 3 of the table-2 is provided for repeating the input-information-change detecting routine in a case where the input information changes to a small degree and the power zooming action is performed for a short period of time.

The output of the system is obtained by comparing the evaluation values of the condition parts of these three rules and by selecting the biggest of the values. This enables the system to perform an optimum AF action in a manner apposite to any of the varied conditions.

As described in the foregoing, the arrangement according to this invention enables an AF system of the kind obtaining focus control information from an image signal, even if the system employs the trial method which involves many ambiguities, to be capable of highly reliably and stably carrying out optimum control in a manner suited to the operability of the operator, because: The system appositely decides to restart focusing by evaluating the information in a state of including ambiguities by a focus motor restart determining algorithm and also by employing a fuzzy inference algorithm of evaluating information of varied kinds in an organically combined state. This eliminates the possibilities that the focusing lens is not moved when there obtains an out-of-focus state and that the quality of images deteriorates because of a poor responsivity.

The foregoing description of the automatic focus adjusting action includes the control algorithm of restarting the focusing lens moving action after the focusing lens 101 is brought to a stop with an in-focus state obtained. It is, however, very important for carrying out the focus adjusting action in a natural manner to control the speed at which the focusing lens is driven.

The focusing lens driving speed must be finely controlled according to the ambient conditions including the degree of focus, etc. Another embodiment of this invention is arranged to meet this requirement. The following describes the focusing lens driving speed control performed by the embodiment:

This embodiment is arranged in the same manner as in the case of the first embodiment shown in FIG. 1. Therefore, the details of the arrangement are omitted from the following description. The control operation of this embodiment is carried out by a control program stored in a microcomputer 107. Like the preceding embodiment, the focusing lens 101 is driven also under the hill climbing control according to the changes of the high-frequency signal component of the video (image) signal and the normalized edge signal which are taken out by the signal processing circuit 105.

Figure 14:
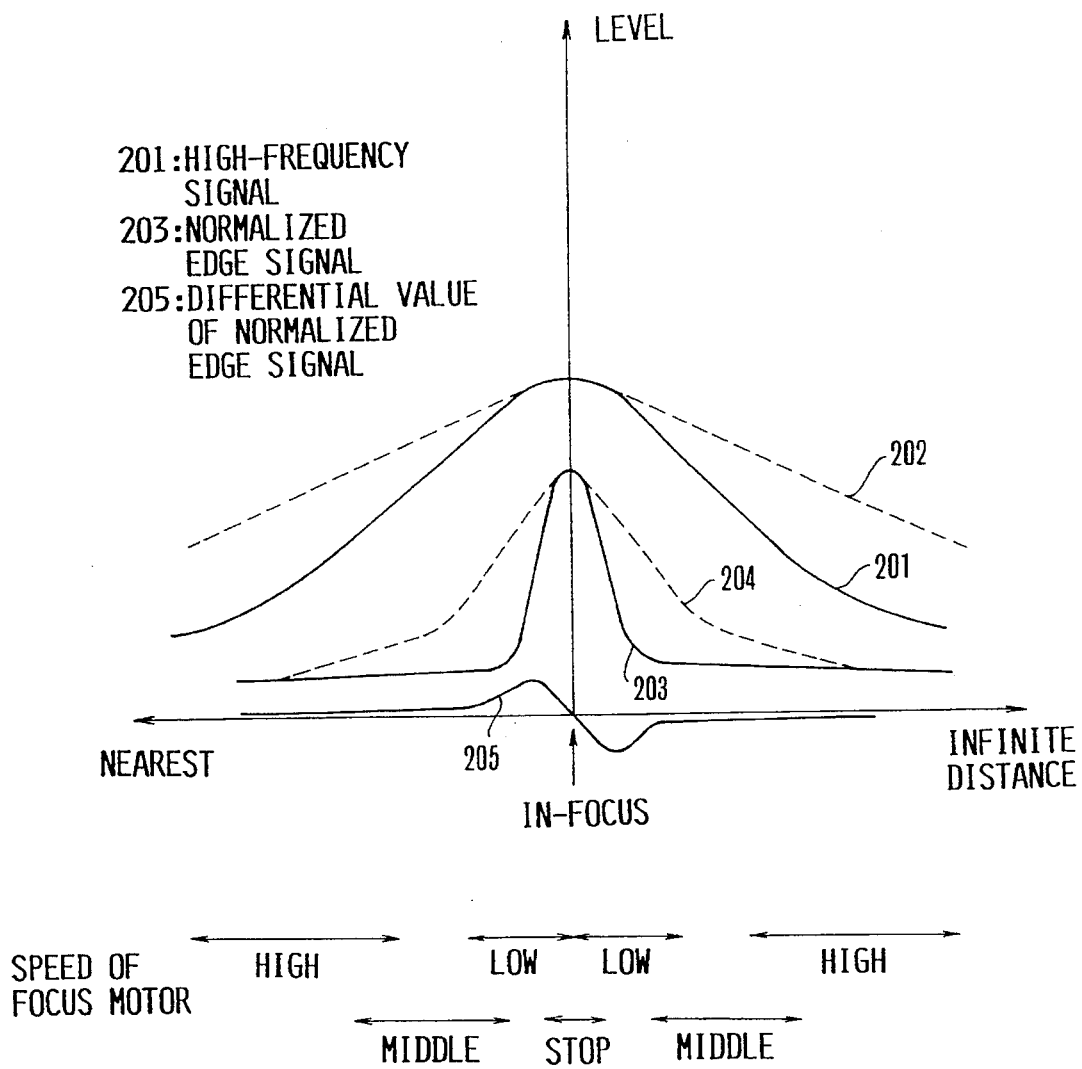
FIG. 14 shows a relation between a focus control signal which varies with the state of focus and a focusing lens driving speed according to the state of focus.

FIG. 14 shows the characteristics of changes of the high-frequency signal component and the normalized edge signal which take place in relation to the position of the focusing lens. The characteristics of these signal components are similar to those shown in FIG. 2. However, FIG. 14 shows the focusing lens driving speeds in addition to these characteristics. As shown, the focusing lens driving speed increases accordingly as the position of the lens deviates further from an in-focus point and decreases accordingly as it comes closer to the in-focus point.

Figure 15:
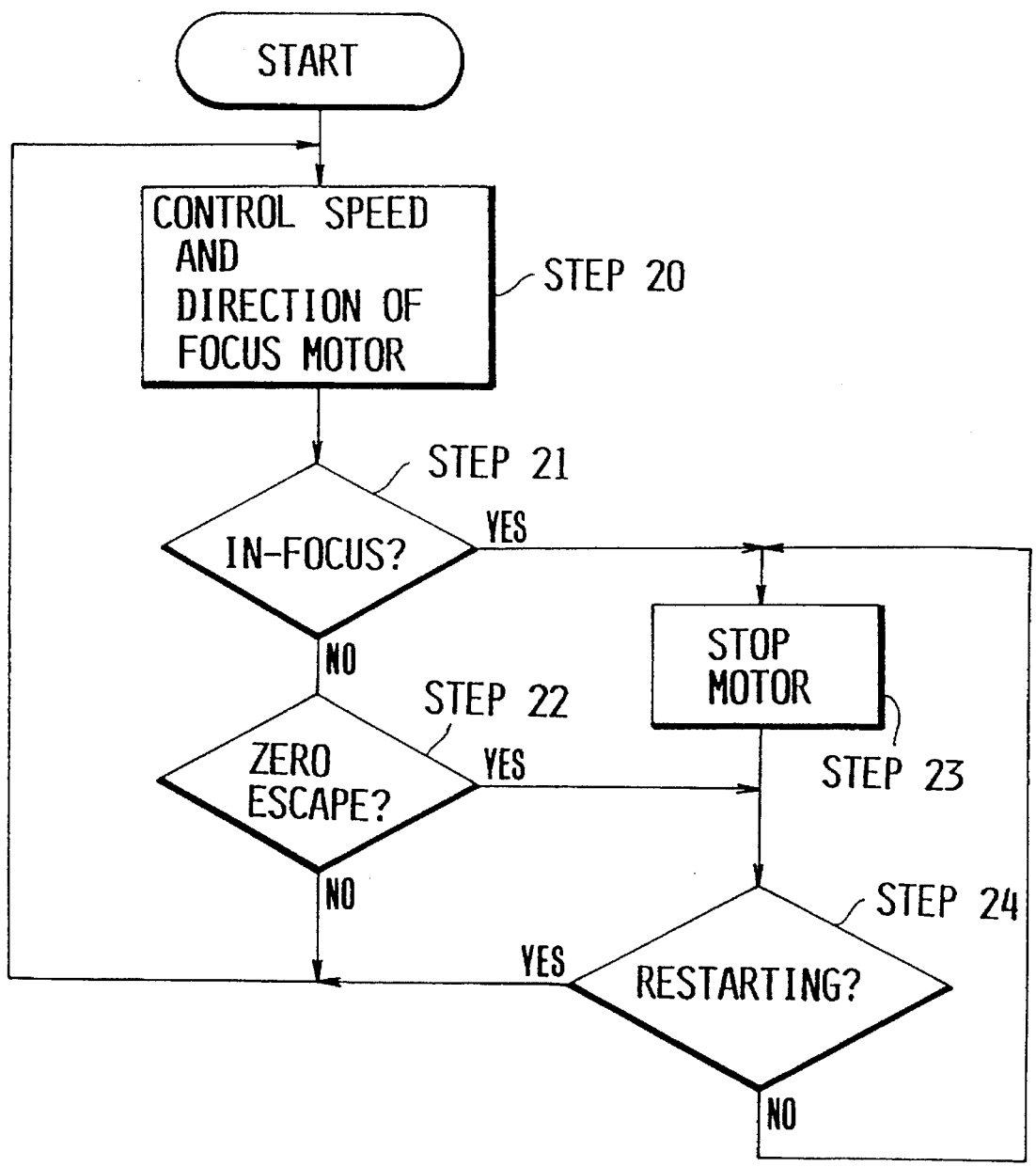
FIG. 15 is a flow chart showing the algorithm of focusing lens driving speed control performed by a fourth embodiment of the invention.

FIG. 15 shows in outline the control algorithm of this embodiment. The control operation of the embodiment can be divided into two basic control loops. Referring to FIG. 15, one of the control loop is executed in the following manner: At a step 20, the driving operation of the focus motor is controlled. At a step 21: A check is made for an in-focus state. If the lens is found to be in an in-focus position, the flow of control comes to a step 23 to bring the motor to a stop. If not, the flow proceeds to a step 22 to execute a zero escape routine. After that the flow comes back to the step 20 to continue the motor driving control. The other loop is a restart determining loop, which is executed as follows: To restart, if necessary, the focus motor which has been brought to a stop after an in-focus state is found at the step 21, the flow comes to a step 24 to determine whether or not the motor is to be restarted by making a check to find if the lens has deviated from the in-focus point. In actually carrying out the control, one round of either of these control loops is executed per field. One control loop is changed over to the other according to the result of each of the above-stated determining routines.

The details of the focus motor control routine of the step 20 are as follows: The control is performed in the manner of climbing the hill of the signal waveform shown in FIG. 2 as mentioned in the foregoing. In actuality, the high-frequency signal component and the normalized edge signal which are input information signals are dependent on the object. The waveforms and levels of them vary with the object, the environment thereof, etc. The normalized edge signal is theoretically unaffected by the contrast of the object. However, in actuality, the edge component itself is sometimes a small object. Besides, in some cases, the edge signal is not accurately obtainable because of the adverse effect of the S/N ratio and the dynamic range of the circuit. Hence, the input information includes ambiguities. To cope with such ambiguous data, the system is arranged to control the focus motor by making a fuzzy inference. The algorithm of the control action is as described below:

Ideal focus motor speed control is as shown in the lower part of FIG. 14. The speed is set at a high speed when the image is in a greatly blurred state deviating much from an in-focus state. The speed is changed from a middle speed to a low speed accordingly as the lens comes closer to an in-focus point; and the motor is preferably brought to a stop at the in-focus point. However, there is no clear boundary between one speed area and another.

In accordance with the rules of the fuzzy inference, the relation of the speeds to the input information (or data) is set forth as shown by a table-3 shown in FIGS. 19(a) and 19(b).

Referring to FIGS. 19(a) and 19(b), a rule 0 is provided for bringing the motor to a stop when the edge signal comes to its peak level (when an in-focus state is attained). A rule 1 (7) is provided for high-speed hill climbing control in the event of a big blur. A rule 2 (8) is provided for high-speed reverse rotation in case of a big blur. A rule 3 (9) is provided for middle-speed hill climbing control in case of a middle blur. A rule 4 (10) is provided for middle-speed reverse rotation in case of a middle blur. A rule 5 (11) is provided for low-speed hill climbing control in the neighborhood of an in-focus point. A rule 6 (12) is provided for low-speed reverse rotation in the neighborhood of an in-focus point. In the table-3, the rules 1 to 6 apply to cases where the focusing lens is shifted by the focus motor toward the infinite distance position. The rules 7 to 12 apply to cases where the focusing lens is shifted by the focus motor toward the nearest distance position.

In each of the formulas of the condition parts ("IF" parts), the left side member of the formula represents input information and the right side member the membership function thereof. In each formula: "P-Small" and "P-Big" represent positive (P) values; "N-Small" and "N-Big" negative (N) values. In each of the output ("THEN") parts, the left side member of it represents the output information and the right side member its membership function.

In the input information, the term "focus motor" as used in the "hill climbing" rule means the current (immediately before the inference is made) focus motor driving direction. The term "focus motor" as used in the "reverse rotation" rule means a direction in which the rotation of the focus motor is delayed for a period of time after effecting the reverse rotation of the motor and before the result of the reverse rotation appears in the input information. The right side member of the formula may be arranged to represent the membership function according to the accuracy of focus motor driving direction detecting means. It is also possible to use a binary value "1" or "0" for the right side member.

Figure 16A:
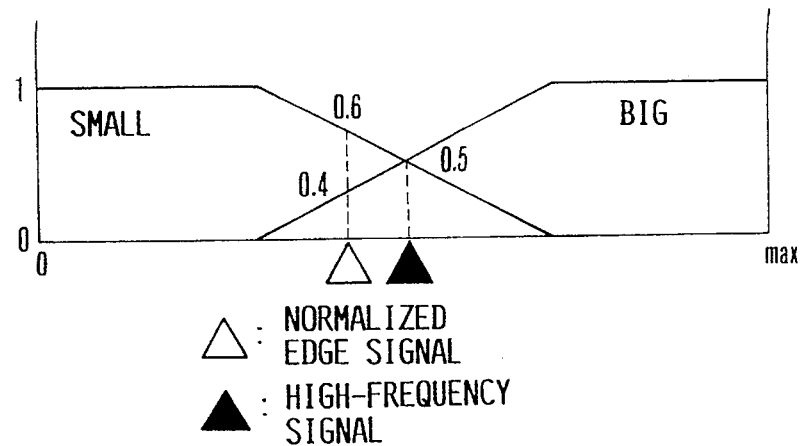
FIGS. 16(a), 16(b) and 16(c) show the membership functions of fuzzy inference control rules employed by the fourth embodiment.
Figure 16B:
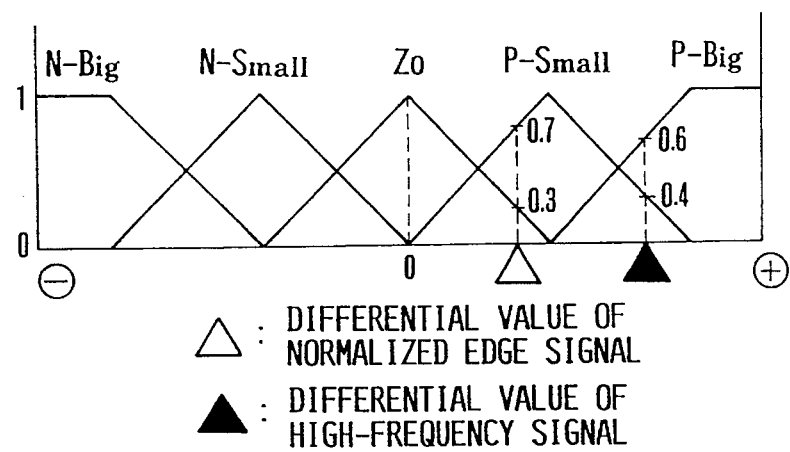
Figure 16C:
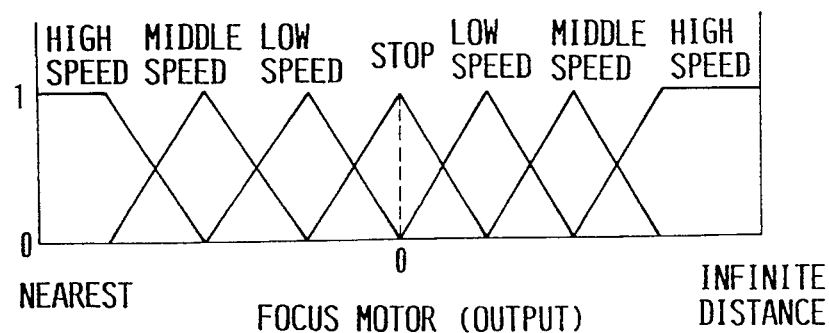

FIGS. 16(a), 16(b) and 16(c) show in outline the membership functions corresponding to the input and output parts of the table-3. FIG. 16(a) shows the membership functions relative to the conditions of bigness and smallness of levels of the normalized edge signal and the high-frequency signal component. FIG. 16(b) shows the membership functions relative to the bigness, smallness and polarity (direction) of the differential values of the normalized edge signal and the high-frequency signal component. FIG. 16(c) shows the membership functions relative to the output, i.e., speed, of the focus motor.

In a case where the input information is obtained as indicated by marks Δ and ▲, for example, a computing operation is performed as follows: The focus motor is assumed in this case to be operating in the direction of the infinite distance.

In this case, the applicable rules are the rules 0, 1 and 3 of the table-3 of FIG. 19(a). Other rules are not used as they are inapposite to this case. For the input value of each formula of each condition part, the crossing point of the membership function of the right hand side member of the formula is the evaluation value of the formula representing the rule. In this instance, each condition formula of each rule is in an && (AND) combination. Therefore, the minimum value of the formula becomes the evaluation value of the condition part.

In the case of the rule 1, for example, the focus motor is driven toward the infinite distance point. Therefore, the degree (probability) of conformity to the condition that "the rotation of the focus motor is toward the infinite distance" is "1". The conforming degree of the actual level of the high-frequency component to the condition that "the high-frequency component level is small" is obtained in the following manner: The actual level value (indicated by the mark ▲) is applied to the function which is shown in FIG. 16(a) representing the condition that the high-frequency component is small. Then, the conforming degree becomes 0.5. Referring to FIG. 16(b), the conforming degree of the differential value of the high-frequency component to the condition that "the focus motor is driven in the positive direction and the differential value of the high-frequency component is small" can be likewise obtained from the function P-Small which represents this condition. The degree of conformity to this condition is thus obtained as 0.4 as shown in FIG. 16(b). These processes can be summarized as shown below:

RULE 1:

Rotating direction of focus motor=Infinity: 1

High-frequency signal=Small: 0.5

Differential value of high-frequency signal=P-Small: 0.4

Then, taking AND, the evaluation value becomes 0.4.

In the case of the rule 0, the degree to which the normalized edge signal is big can be obtained as 0.4 from FIG. 16(a) and the degree to which the differential value of the normalized edge signal is "0" is obtained as 0.3 from FIG. 16 (b). This can be summarized as follows:

RULE 0:

Normalized edge signal=Big: 0.4

Differential value of normalized edge signal=Zo: 0.3

Then, taking AND, the evaluation value becomes 0.3,

A summary for the rule 3 is as follows:

RULE 3:

Focus motor=Infinite distance: 1

High-frequency signal=Small: 0.5

Differential value of high-frequency signal=P-Big: 0.6

Differential value of normalized edge signal=P-Small: 0.7

Then, taking AND, the evaluation value becomes 0.5

Figure 17:
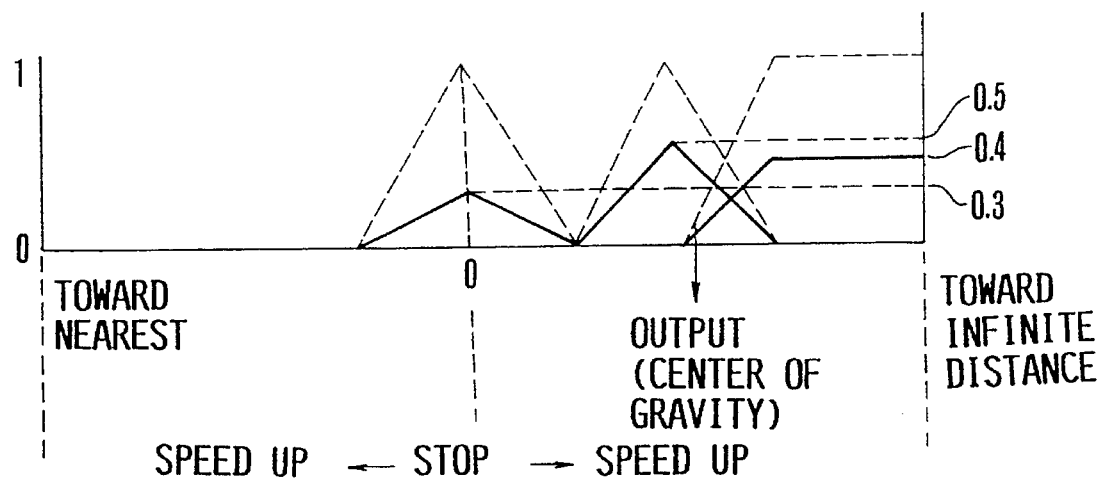
FIG. 17 shows by way of example an output computing operation performed in accordance with a fuzzy inference.

The output obtained in the case of this example becomes as shown in FIG. 17. FIG. 17 shows a computing operation performed for obtaining a focus lens driving speed output. In FIG. 17, a reference numeral 0 at a middle point of the drawing denotes a speed 0 which means that the focusing lens lies at rest. The focusing lens driving direction toward the infinite distance position is shown on the right hand side of the middle point 0. The lens driving speed increases accordingly as the point of output is further away in this direction. The focusing lens driving direction toward the nearest distance position is shown on the left hand side of the middle point 0. The lens driving speed increases accordingly as the output point is further away from the middle point 0 in that direction. In FIG. 17, full lines indicate values obtained by multiplying the output by the evaluation values of the condition parts described in the foregoing. The actual output is obtained at the barycenter point of the full line part which is indicated by a downward arrow mark. This barycenter point is determined by taking into consideration all the degrees of conformity to the above-stated applicable rules. This is an evaluation value most apposite and naturally representing the current conditions. Therefore, it is most apposite to drive the focusing lens toward the infinite distance position at the speed indicated by this barycenter point.

The method for computing the condition-conforming-degree evaluating value and obtaining the output value is not limited to the above-stated method. They can be computed also by some other suitable methods.

The above-stated control based on the fuzzy inference enables the system to perform natural focus control by smoothly controlling the speed and the direction of the focus motor relative to input information.

A stop determining (or deciding) routine is described as follows: As mentioned in the foregoing, the normalized edge signal has a steep peak in the neighborhood of the in-focus point. Therefore, the differential signal of the edge signal also has a peak immediately before the in-focus point as indicated by the curve 205 in FIG. 14. Referring again to FIG. 15, the in-focus state determining routine, i.e., the stop deciding routine, of the step 21 is executed by detecting the peak waveform and then by bringing the focusing motor to a stop at a zero-crossing point which appears next to the peak. If the motor is decided to be stopped, the flow of control comes to the restart determining loop of the step 24.

The zero escape routine of the step 23 is executed as follows: The rules of the above-stated fuzzy inference for the focus motor control routine do not always assure that one or more of these rules apply to any of various natural image shooting conditions.

In other words, under some special conditions, any of the rules might fail to apply during the process of the motor control loop and the system might become incapable of coming out of the loop. The zero escape routine is provided against this sort of situation. In the zero escape routine, the flow of control is shifted to the restart determining loop upon detection of the zero speed of the focus motor.

The details of the restart determining routine of the step 24 are as follows: The flow comes to the step 24 for the restart determining loop when the focus motor is brought to a stop with an in-focus state determined by the stop determining routine or when no rule of the fuzzy inference is found applicable by the zero escape routine. In the restart determining routine, a check is made for an in-focus state every time a change of the image is detected through a change taking place in the input information. If the lens is determined to be out of focus, the focus motor is restarted and the flow of control comes to the step 20 to execute the focus motor control loop. Further, in determining the lens to be in focus, the focus motor is tentatively moved to a slight extent to determine if the focusing lens is located at the peak of the hill in the same manner as in the case of the first embodiment described in the foregoing.

As described above, the speed and direction of the focus lens can be smoothly controlled by the automatic focusing algorithm including the fuzzy inference.

While the high-frequency signal component and the normalized edge signal are employed as the focus control information by the system described, the system according to this invention may be arranged to use the outputs of a plurality of high-pass filters in place of them. More specifically, a plurality of frequency bands may be extracted from the video signal, because: A very high-frequency component of the video signal is obtained in the neighborhood of an in-focus point while a low-frequency component corresponds to a greatly blurred part.

Figure 18:
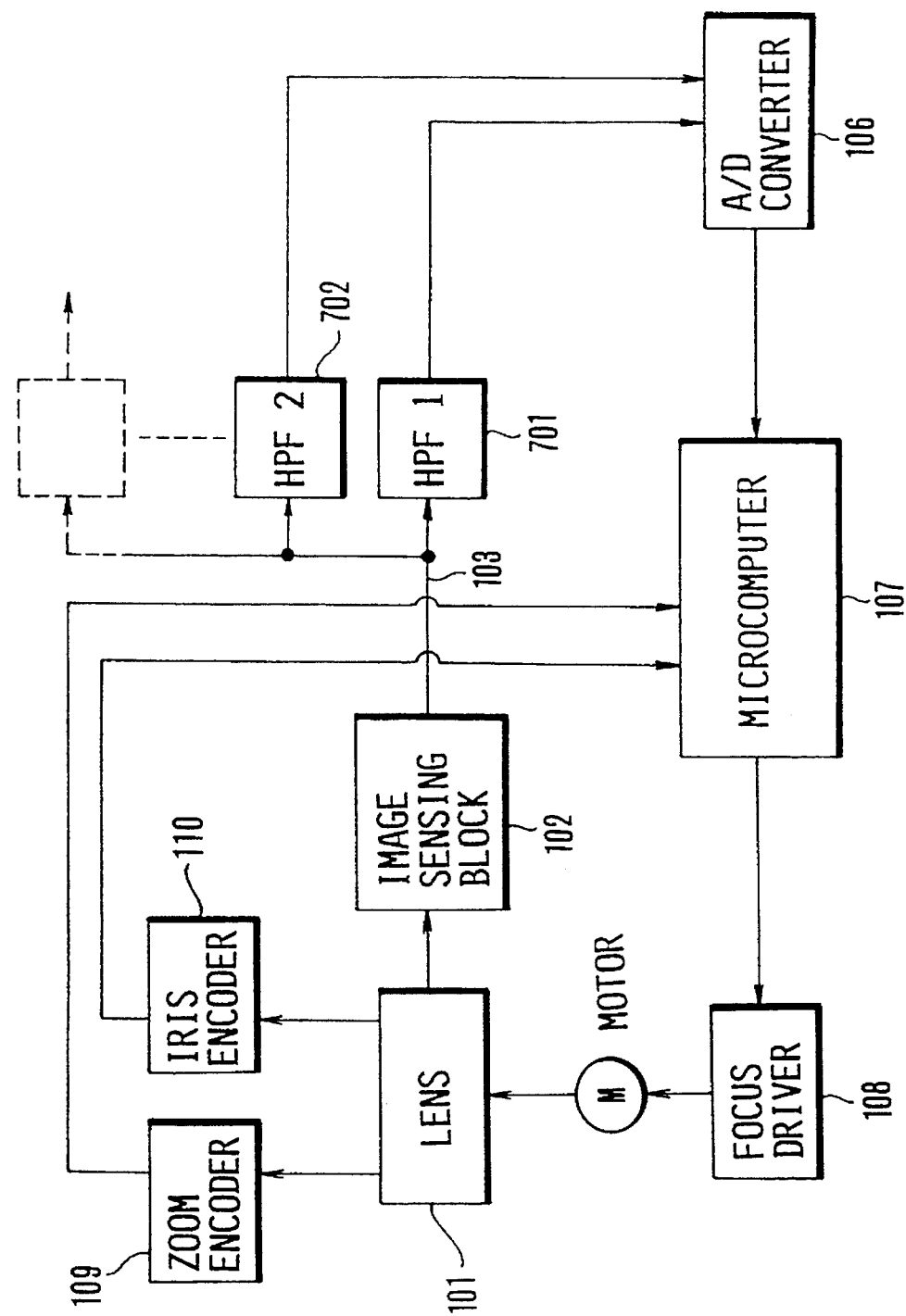
FIG. 18 is a block diagram showing a fifth embodiment of the invention.

An example of the above-stated arrangement is as shown in FIG. 18. The arrangement shown in FIG. 18 differs from the arrangement of FIG. 1 in the following point: A plurality of high-pass filters 701, 702, . . . are arranged to have different pass-band characteristics and to obviate the necessity of the signal processing circuit 105. In this case, the A/D converter 106 is arranged to be used in a time sharing manner. The characteristics of the high-pass filters are arranged in such a way as to form a steeper peak in the neighborhood of an in-focus point accordingly as the cut-off frequency of them is higher, so that the shape of their characteristics resembles that of the normalized edge signal. However, their dynamic range is much larger than that of the normalized edge signal. The inference algorithm is similar to the algorithm used for the normalized edge signal. In this case, the use of the normalized edge signal is replaced with the high-frequency signal component having a steep peak. Therefore, the membership function must be set according to the steep peak.

The system dispenses with the signal processing circuit 105 which is used in signal processing for computing the normalized edge signal. This is an advantage of the system in terms of cost.

As described in the foregoing, the automatic focusing system according to this invention uses the fuzzy inference algorithm for controlling the speed of the focus motor. The system is thus arranged to evaluate the state of focus by using information of varied kinds in an organically combined state with ambiguities allowed to be included in the focus detection information. This arrangement enables the system to set the focus adjustment speed at a speed apposite to any of various situations. The invented system is therefore capable of reliably and stably performing optimum control over the automatic focusing action with a good responsivity in a manner suited to the sensation of the operator.

While, in one of the embodiments described, the fuzzy inference is applied to the restart determining process, the fuzzy inference is applied to the focusing adjustment speed control process in the case of another embodiment. However, it is, of course, possible to apply the fuzzy inference to both of these control processes. The arrangement according to this invention enables an automatic focusing system of the kind making focus adjustment for images that give information including many ambiguities, like in the case of a moving object in particular, to perform the control in a more natural manner than the conventional system by processing the ambiguous information as it is, instead of simply making a binary decision.

What is claimed is:

1. An automatic focusing system comprising:

a) detecting means for detecting, from an image signal, a predetermined parametric signal which varies with the condition of focus;

b) computing means for computing and producing focus control information on the basis of said parametric signal detected by said detecting means by using a fuzzy inference algorithm; and c) focus control means controlling a response of adjusting the focus condition on the basis of the focus control information produced from said computing means.

2. An apparatus according to claim 1, wherein said detecting means is arranged to detect a plurality of signals which vary according to the condition of focus and have different characteristics from each other.

3. An apparatus according to claim 2, wherein said plurality of signals include a high-frequency component of said image signal and an edge signal which corresponds to the width of the edge part of an object image.

4. An apparatus according to claim 1, wherein said computing means having a plurality of predetermined rules used in said fuzzy inference algorithm and said predetermined rules exist in a plural number, and wherein said computing means is arranged to collate with said predetermined rules a plurality of pieces of information including detected information output from said detecting means, to compute a degree to which said plurality of pieces of information conform to said predetermined rules, and to obtain output control information for driving and controlling said focus control means.

5. An apparatus according to claim 4, wherein said plurality of pieces of information include a high-frequency component of said image signal, an edge signal corresponding to the width of the edge part of an object image and a signal obtained by differentiating said edge signal.

6. An apparatus according to claim 4, wherein said computing means is arranged to determine the arrival of said focus control means at an in-focus point by performing a computing operation and to bring said focus control means to a stop upon its arrival at said in-focus point.

7. An apparatus according to claim 4, wherein said computing means is arranged to determine, by performing a computing operation, whether or not said focus control means is allowed to restart a focus adjusting action thereof after said focus control means has stopped upon its arrival at an in-focus point.

8. An apparatus according to claim 7, wherein said computing means is arranged to determine the restart of said focus control means by taking into consideration a change in the detected information when said focus control means is shifted to a minute extent according to information detected by said detecting means, a temporal change in an object image itself, a temporal change in the distance of the object image and a change in photographing conditions such as the depth of field.

9. An apparatus according to claim 8, wherein said computing means is arranged to compute and obtain a degree to which said plurality of pieces of information conform to a plurality of preset and predetermined rules from a plurality of membership functions and to perform, on the basis of the result of the computation, an output information computing operation by using said fuzzy inference algorithm.

10. An apparatus according to claim 1, wherein said focus control means is arranged to adjust focus by shifting the position of a focusing lens.

11. An automatic focusing apparatus comprising:

a) focus adjusting means for adjusting focus on the basis of a parametric signal which is extracted from an image signal and varies according to a condition of focus; and b) restart determining means for restarting a focus adjusting action of said focus adjusting means according to a change in the state of focus after said focus adjusting means is brought to a stop, said restart determining means being arranged to determine whether to restart said focus adjusting means or not on the basis of said parametric signal by using a fuzzy inference algorithm with a plurality of predetermined rules and membership functions.

12. An apparatus according to claim 11, wherein said plurality of rules are previously set for said detected information, and wherein said restart determining means is arranged to obtain, on the basis of said plurality of membership functions, a degree to which said detected information satisfies said plurality of rules and to determine whether or not the state of focus deviates from an in-focus point on the basis of information on said degree.

13. An apparatus according to claim 12, wherein said detected information includes at least a high-frequency component signal of said image signal, an edge signal corresponding to the edge width of an object image and a signal obtained by differentiating said edge signal.

14. An apparatus according to claim 12, wherein said restart determining means is arranged to determine the restart of said focus adjusting means by taking into consideration a change in the detected information when said focus adjusting means is shifted to a minute extent according to the detected information, a temporal change in an object image, a temporal change in the distance of the object image and a change in photographing conditions such as the depth of field.

15. An apparatus according to claim 12, wherein said plurality of membership functions used by the restart determining means include input membership functions and output membership functions, a degree to which said detected information satisfies said plurality of rules is obtained on said plurality of input membership functions, and output control information is obtained by performing, on said output membership functions, a barycentric computing operation on said degree thus obtained.

16. An apparatus according to claim 11, wherein said focus adjusting means includes a focusing lens.

17. An automatic focusing apparatus comprising:
a) detecting means for detecting, from an image signal, a predetermined parametric signal which varies according to a condition of focus;
b) focus adjusting means for adjusting focus by varying the condition of focus;
c) computing means for computing and producing focus control information on the basis of said parametric signal detected by said detecting means by using a fuzzy inference algorithm with predetermined rules and predetermined membership functions; and
d) control means for controlling a focus adjusting speed of said focus adjusting means on the basis of the focus control information.

18. An apparatus according to claim 17, wherein said detected information includes at least a high-frequency component signal of said image signal, an edge signal representing the edge width of an object image and a signal obtained by differentiating said edge signal, and wherein said control means is arranged to compute and control the speed of said focus adjusting means by using said signals as input information.

19. An apparatus according to claim 18, wherein said rules include a plurality of rules previously set for said detected information, and wherein said control means is arranged to obtain a degree to which said detected information satisfies said plurality of rules on the basis of a plurality of membership functions and to compute the driving speed of said focus adjusting means on the basis of information on said degree thus obtained.

20. An apparatus according to claim 19, wherein said plurality of membership functions used by said control means include input membership functions and output membership functions, a degree to which said input information satisfies said plurality of rules is obtained on said plurality of input membership functions, and speed control information is obtained by performing, on said output membership functions, a barycentric computing operation on said degree thus obtained.

21. An apparatus according to claim 20, wherein said control means is arranged to drive said focus adjusting means at a higher speed accordingly as the state of focus deviates to a greater extent from an in-focus point and at a lower speed accordingly as the state of focus becomes closer to said in-focus point.

22. An apparatus according to claim 17, wherein said focus adjusting means is a focusing lens.

23. A video camera comprising:
a) image sensing means for photo-electrically converting an object image formed on an image sensing plane by a focusing lens to produce an image signal;
b) detecting means for detecting, from said image signal, a parametric signal which varies according to a condition of focus;
c) focus adjusting means for adjusting focus condition by driving said focusing lens to vary the condition of the object image formed on said image sensing plane;
d) computing means for computing and producing focus control information relative to a driving direction and a driving speed of said focusing lens on the basis of said parametric signal detected by said detecting means by using a fuzzy inference algorithm with predetermined rules and predetermined membership functions;
e) control means for controlling a driving direction and a driving speed of said focusing lens on the basis of the focus control information produced from said computing means; and
f) restart control means for restarting said focus adjusting means by detecting that the position of said focusing lens again deviates from an in-focus point after said focusing lens is brought to a stop at said in-focus point by using a fuzzy inference algorithm.

24. A video camera according to claim 23, wherein said detected information includes at least a high-frequency component signal of said image signal, an edge signal representing the edge width of the object image and a signal obtained by differentiating said edge signal, and wherein said computing means is arranged to compute and control the speed of said focus adjusting means by using said signal as input information.

25. A video camera according to claim 24, wherein said computing means is arranged to obtain a degree to which said detected information satisfies said plurality of rules on the basis of said plurality of membership functions and to compute the driving speed of said focus adjusting means on the basis of information on said degree.

26. A video camera according to claim 25, wherein said plurality of membership functions used by said computing means include input membership functions and output membership functions, a degree to which said input information satisfies said rules is obtained on said plurality of input membership functions, and speed control information is obtained by performing, on said output membership functions, a barycentric computing operation on said degree.

27. A video camera according to claim 23, wherein said restart control means is arranged to collate, with preset and predetermined rules, detected information based on said parametric signal detected by said detecting means to determine whether to restart said focusing lens or not and determine the direction of the restart on the basis of a degree to which said detected information conforms to said rules, and to control said focusing lens on the basis of the result of computation.

28. A video camera according to claim 27, wherein said rules are a plurality of rules previously set for said detected information, and wherein said restart determining means is arranged to obtain, on a plurality of membership functions, a degree to which said detected information satisfies said plurality of rules and to determine whether or not said focusing lens has deviated from an in-focus point on the basis of information on said degree.

29. An automatic focus adjusting apparatus comprising:

a) detecting means for detecting from an image signal a parametric signal which varies according to the state of focus;

b) focus adjusting means for adjusting focus by varying the state of focus; and c) computing means arranged to collate detected information based on said parametric signal detected by said detecting means with preset and predetermined rules, to compute control information to be used for controlling a focus adjusting action of said focus adjusting means on the basis of a degree to which said detected information satisfies said rules with a fuzzy inference algorithm and to supply said control information to said focus adjusting means; and d) escape means for causing said focus adjusting means to escape from any control performed on the basis of the output of said computing means in the case that said detected information does not satisfy said predetermined rules.

30. An apparatus according to claim 29, wherein said control information computed by said computing means relates to the driving speed of said focus adjusting means.

31. An apparatus according to claim 30, wherein said detected information includes at least a high-frequency component signal of said image signal, an edge signal representing the edge width of the object image and a signal contained by differentiating said edge signal, and said computing means is arranged to compute and control the speed of said focus adjusting means by using said signals as input information.

32. An apparatus according to claim 31, wherein said rules are previously set for said detected information, and wherein said computing means is arranged to obtain a degree to which said detected information satisfies said plurality of rules on the basis of a plurality of membership functions and to compute the driving speed of said focus adjusting means on the basis of information on said degree.

33. An apparatus according to claim 32, wherein said plurality of membership functions used by said computing means include input membership functions and output membership functions, a degree to which said input information satisfies said rules is obtained on said input membership functions, and speed control information is obtained by performing a barycentric computing operation on said degree on the basis of said output membership functions.

34. An apparatus according to claim 33, wherein said computing means is arranged to drive said focus adjusting means at a higher speed accordingly as the state of focus deviates to a greater extent from an in-focus point and at a lower speed accordingly as the state of focus becomes closer to said in-focus point.

35. An apparatus according to claim 29 or 34, wherein said escape means is arranged to stop any control from being performed on the basis of the result of the computing operation of said computing means and to shift the mode of control to a restart determining mode when said detected information does not satisfy said predetermined rules.

36. An apparatus according to claim 35, wherein said escape means is arranged to shift the mode of control from a speed control mode to the restart determining mode when speed control becomes impossible while said detected information does not satisfy said predetermined rules.

37. An automatic focusing apparatus comprising:

a) focus adjusting means for adjusting a focus condition;

b) detecting means for detecting, from an image signal, a plurality of predetermined parametric signals which vary with the state of focus;

c) computing means for computing and producing focus control information on the basis of said parametric signal detected by said detecting means said information relative to a past driven direction of said focus adjusting means with a fuzzy inference algorithm; and c) control means for controlling said focus adjusting speed of said focus adjusting means on the basis of the focus control information produced from said computing means.

38. An apparatus according to claim 37, wherein said computing means is arranged to determine whether said focus adjusting means is to be restarted or not after it has stopped, by performing a computing operation based on a fuzzy inference algorithm, and said control means is arranged to restart said focus adjusting means when it has been determined that said focus adjusting means is to be restarted by said computing means.

39. An apparatus according to claim 37, wherein said plurality of predetermined parametric signals include a high frequency component contained in said image signal, its differentiated value and an edge information.

40. An apparatus according to claim 39, wherein said computing means is further arranged to perform a computing operation, by using zooming information and depth of field information.

41. An apparatus according to claim 40, said computing means including a plurality of rules and a plurality of membership functions and the fuzzy inference is effected by substituting said rules with said plurality of predetermined parametric signals and substituting said membership functions with probabilities of satisfying said rules.

42. A video camera comprising:

a) image sensing means for photo-electrically converting an object image formed on an image sensing plane by a focusing lens to produce a signal;

b) detecting means for detecting, from the image signal, a plurality of parametric signals which varies according to a condition of focus;

c) driving means for driving a focusing lens to adjust the focus condition;

d) computing means for computing and producing focus control information relative to a driving direction and a driving speed of said focusing lens on the basis of said parametric signals detected by said detecting means by using a fuzzy inference algorithm with predetermined rules and predetermined membership functions; and e) control means for controlling the driving direction and the driving speed of said focusing lens on the basis of the focus control information produced from said computing means.

43. A video camera according to claim 42, wherein said control means controls said driving means to restart focus adjusting action by detecting that the position of said focusing lens again deviates from an in-focus point after said focusing lens is brought to a stop at said in-focus point by using a fuzzy inference algorithm.

44. A video camera according to claim 43, wherein said computing means is arranged to determine, by performing computation, as to whether the restart is to be effected or not and a direction in which the restart is to be effected.

45. A video camera according to claim 43, wherein said computing means is arranged to effect the fuzzy computation by substituting said plurality of rules with said parametric signals and substituting the membership functions with the degrees to which said rules are satisfied.

46. A video camera according to claim 45, wherein said computing means is arranged to effect the fuzzy computation, by further using information concerning a past driving state of the focusing lens, a zooming state and a depth of field.

47. A video camera apparatus comprising:
 a) image sensing means for converting an image to output an image signal;
 b) detecting means for detecting, from an image signal, a plurality of predetermined parametric signals which vary with the condition of focus;
 c) computing means for computing and producing focus control information relative to a driving speed and a driving direction of focusing operation on the basis of said predetermined parametric signal with a fuzzy inference algorithm; and
 d) focus control means for adjusting the focus condition on the basis of the focus control information produced from said computing means.

48. An apparatus according to claim 47, wherein said parametric signals further include a focus signal based on an edge component of the image.

49. An apparatus according to claim 47, wherein said fuzzy inference algorithm includes a plurality of rules and a plurality of membership functions, and the fuzzy inference algorithm is executed by substituting the respective rules with said parametric signals and substituting said membership functions with the degrees to which said rules are satisfied.

50. An apparatus according to claim 49, wherein said membership functions include a plurality of input membership functions and at least one output membership function.

51. An apparatus according to claim 47, wherein said computing means is arranged to determine the arrival of said focus control means at an in-focus point by performing a computing operation and to bring said focus control means to a stop upon its arrival at said in-focus point.

* * * * *

UNITED STATES PATENT AND TRADEMARK OFFICE
CERTIFICATE OF CORRECTION

PATENT NO. : 5,566,380

DATED : October 15, 1996

INVENTOR(S): Hideo Honma

It is certified that error appears in the above-identified patent and that said Letters Patent is hereby corrected as shown below:

On the cover page, Item [30], line 3, change "1-233836" to -- 1-233835 --.

Col. 10, line 29, change "S2=SΔ" to -- S2=S- --.

Signed and Sealed this

Seventeenth Day of June, 1997

Attest:

Attesting Officer

BRUCE LEHMAN

Commissioner of Patents and Trademarks